United States Patent
Whalen et al.

(10) Patent No.: US 11,093,641 B1
(45) Date of Patent: Aug. 17, 2021

(54) ANONYMIZING SENSITIVE DATA IN LOGIC PROBLEMS FOR INPUT TO A CONSTRAINT SOLVER

(71) Applicant: Amazon Technologies, Inc., Seattle, WA (US)

(72) Inventors: Michael William Whalen, Seattle, WA (US); Carsten Varming, Brooklyn, MN (US); Neha Rungta, San Jose, CA (US); Andrew Judge Gacek, Maple Grove, WA (US); Murphy Berzish, Edina, MN (US)

(73) Assignee: Amazon Technologies, Inc., Seattle, WA (US)

( * ) Notice: Subject to any disclaimer, the term of this patent is extended or adjusted under 35 U.S.C. 154(b) by 282 days.

(21) Appl. No.: 16/219,742

(22) Filed: Dec. 13, 2018

(51) Int. Cl.
| G06F 21/62 | (2013.01) |
| G06N 5/00 | (2006.01) |
| G06F 16/903 | (2019.01) |
| G06K 9/00 | (2006.01) |
| H04L 29/06 | (2006.01) |
| G06F 16/906 | (2019.01) |

(52) U.S. Cl.
CPC ........ G06F 21/6254 (2013.01); G06F 16/906 (2019.01); G06F 16/90344 (2019.01); G06F 21/6227 (2013.01); G06K 9/00463 (2013.01); G06N 5/003 (2013.01); H04L 63/20 (2013.01)

(58) Field of Classification Search
CPC ............. G06F 21/6227; G06F 21/6254; G06F 16/906; G06F 16/90344; H04L 63/20; G06N 5/003; G06K 9/00463

USPC .......................................................... 726/26
See application file for complete search history.

(56) References Cited

U.S. PATENT DOCUMENTS

| 8,938,433 B2 * | 1/2015 | Miyakawa | G06F 21/6254 707/705 |
| 2009/0165110 A1 * | 6/2009 | Becker | G06F 21/6218 726/9 |
| 2012/0017260 A1 * | 1/2012 | Narain | G06F 13/362 726/1 |
| 2013/0031596 A1 * | 1/2013 | Becker | G06F 21/604 726/1 |

(Continued)

*Primary Examiner* — Bryan F Wright
(74) *Attorney, Agent, or Firm* — Nicholson De Vos Webster & Elliott LLP

(57) ABSTRACT

A document anonymization system transforms structured documents, such as security policies, that contain user-specific and other sensitive data, producing encoded logic problems in the format or language of one or more constraint solvers; the logic problems do not contain any of the sensitive data. The system may perform a one- or two-stage anonymization process: in a first stage, the electronic document is analyzed according to its document type to identify parameters likely to contain sensitive data, and the associated values are replaced with arbitrary values; in a second stage, after the anonymized electronic document is converted into logic formulae representing the data, the system performs replacements of string constants in the logic formulae with arbitrary strings to further anonymize the sensitive data. The system may confirm that anonymization preserves the document structure, difficulty level, and satisfiability of the original document by executing the constraint solver against the anonymized logic problem.

20 Claims, 7 Drawing Sheets

(56) References Cited

U.S. PATENT DOCUMENTS

2014/0164052 A1\* 6/2014 Pesci-Anderson ..... G06Q 40/08
705/7.28
2019/0205869 A1\* 7/2019 Nair ..................... G06Q 20/383

\* cited by examiner

ANONYMIZING SENSITIVE DATA IN LOGIC PROBLEMS FOR INPUT TO A CONSTRAINT SOLVER

BACKGROUND

In typical computer programming best practices, computer code for programs, libraries, data structures, and other machine-executable resources is subjected to a validation process. A validation process may check not only that the code is executable (i.e., does not contain syntax errors), but also that a computer executing the code performs the actions that the programmer intended the computer to perform. There are many tools for validating code, and the best tool may depend on properties of the code being validated.

Constraint solvers are software tools that operate based on the theoretical computer science field of constraint programming: a given source code is validated by determining whether the relationships between variables in the source code remain consistent and do not conflict with each other. Each relationship is represented by one or more constraints that impose conditions that the variables in the relationship must satisfy. If the set of all constraints correctly models all of the relationships in the source code, a constraint solver that is configured to interpret the format of the constraints validates the code in two steps: first, by determining whether any "solutions" exist, in which each variable is set to a corresponding value such that all of the constraints are satisfied; and next, if the constraint problem representing the source code is satisfiable, by returning one or more models of the derived solutions, the models containing sets of values for the variables, and a programmer can confirm whether or not he/she intended for the source code to be satisfied by the corresponding values.

Constraint solvers using many different theories of operation are available. Generally though, presently available solvers are in early stages of development, and because they apply sophisticated, largely academic computation theories, the solvers are difficult to use. A computer program or other code resource must be translated into a logical formula understood by the solver in order to be used as input. Additionally, solvers can struggle and even fail to correctly analyze problems having certain structures or levels of complexity. It is expected, however, that by processing a large number of code examples having a problematic structure, a constraint solver and/or its underlying theories can be improved for solving the corresponding type of problem.

In a network of hardware computing devices, such as servers that are connected to each other to provide virtual computing resources and services to users of a computing resource service provider, there is great value in ensuring the security of resources and data. Access to resources can be tightly controlled based on many different parameters, such as user credentials, resource attributes, network configurations, and the like. Access rights of users and resources, in the context of a computing resource service provider, may be defined using security policies that specify whether to grant or deny a requesting device access to a computing resource. Network configurations can also have security policies for determining the security of the network.

Security policies can in one aspect be highly repeatable data structures, commonly invoking a limited set of variables. However, as the number and types of users, and/or the number and types of accessible computing resources, that are supported in a computer system or computer network expands, policy complexity may increase; it may become increasingly difficult to manage security policies, and to validate that computing resources are being made available with secure network configurations and effective security policies in place. Security policies thus can be a source for a problem type that is difficult for a constraint solver to solve.

BRIEF DESCRIPTION OF THE DRAWINGS

Various techniques will be described with reference to the drawings, in which.

DETAILED DESCRIPTION

Figure 1A:
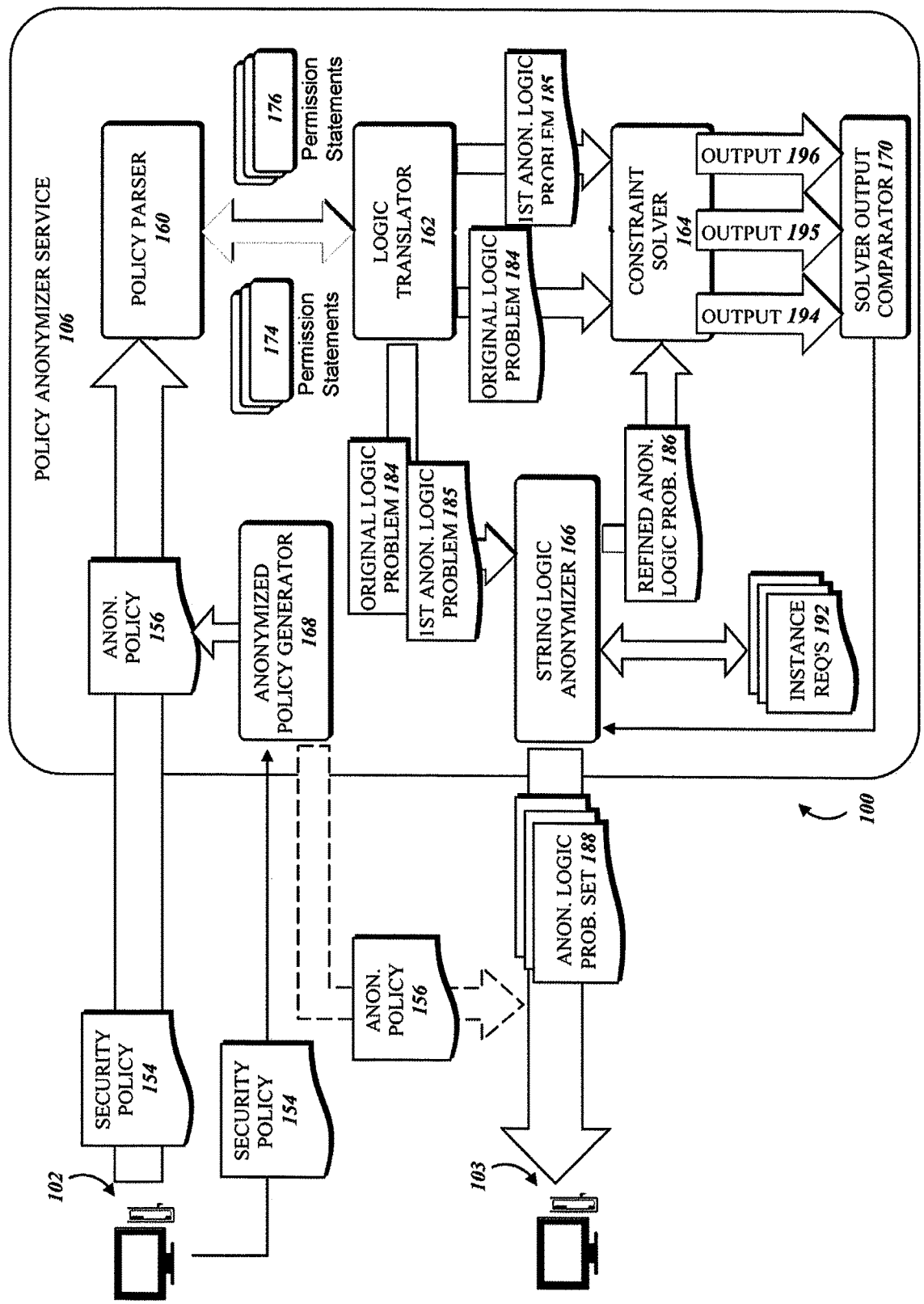
FIGS. 1A-B illustrate a computing environment of a computing resource service provider, in which various embodiments of the present systems and methods can be implemented in accordance with this disclosure.

In the context of a computing resource service provider, a client makes requests to have computing resources of the computing resource service provider allocated for the client's use. One or more services of the computing resource service provider receive the requests and allocate physical computing resources, such as usage of a computer processor, memory, storage drives, computer network interfaces, and other components of a hardware computing device, to the client. In some computing systems, a virtualization layer of the computing system generates instances of "virtual" computing resources that represent the allocated portion of corresponding physical computing resources. Thus, the client may operate and control instances of virtual computing resources, including without limitation: virtual machine instances each emulating a complete computing device having an operating system, processing capabilities, storage capacity, and network connections; virtual machine instances or other containers for performing specific processes; virtual network interfaces each enabling one or more virtual machine instances to use an underlying network interface controller in isolation from each other; virtual data stores operating like hard drives or databases; and the like. The computing resource service provider may provision the virtual computing resources to the client in the client's own virtual computing environment(s), which can be communicatively isolated from the environments of other clients. A control plane and/or other layers of the computing infrastructure connect the virtual computing environment of a particular user to the various services and backend resources of the computing resource service provider, pursuant to any relevant authorizations and configurations in place.

Virtual computing resources are deployed into a client's virtual computing environment by creating an associated instance within corresponding resources allocated to the environment, and connecting the instance to other virtual computing resources and sometimes also to computing networks that interface with end user devices. In one implementation, the virtualization layer (e.g., containing one or more hypervisors) of the computing system generates one or more virtual networks within the environment, and a new instance receives an address (e.g., an IPv4 address) on the virtual network and can then communicate with other components on the virtual network. The virtual network may be attended by physical or virtual networking components such as network interfaces, firewalls, load balancers, and the like, which implement communication protocols, address spaces, and connections between components and to external communication networks (e.g., the internet and other wide-area networks). The computing resource service provider may allow the client to configure its virtual computing resources so they can receive connections from the computing devices of end users; the client's virtual computing resources can provide software applications, web services, and other computing services to the end users. In various implementations, a client can configure various aspects of the virtual network and its attendant components.

In order to manage the interoperability of the various services and data stores, while also enabling clients to customize their deployed resources AND maintaining data privacy, security, and integrity, a computing resource service provider may employ many types of structured documents that define how users and services communicate within the computing environment. Such structured documents include data structures, file formats, resource type definitions, security and other access policies, communication protocols, process workflows, business logic, data analytics rule sets, optimization logic, etc. The structure of a structured document can identify and arrange various required and optional parameters, including defining relationships between various parameters within the document as well as relationships between document parameters and other resources inside or outside the computing environment. Instances of a document type adopt the corresponding structure and can include custom arrangements of the document parameters as well as unique (e.g., user-specific) values for the parameters.

Structured documents can be created and integrated into computing operations by clients and other users, by agents of the provider such as system administrators, software engineers, and customer service agents, or by automated operations; as such, the documents can contain typographic errors, poor or inefficient design, and other inadvertent (or intentional) instructions and/or omissions that, when the document is applied by computer processors, cause the processors to attempt invalid operations, corrupt or misprocess stored data, create or expose security vulnerabilities, or otherwise operate differently than intended. For example, a client may create a configuration for a virtual network interface to serve as an "endpoint" with a publicly available IP address that end user devices can connect to (e.g., by typing the IP address into a browser program); the configuration may leave certain ports undesirably open to access by an end user device that is looking for open ports. A security policy is another example type of structured document that is used extensively to describe the invention. A security policy can be created and associated with, for example, a particular end user, a group of end users, a particular virtual computing resource (e.g., a virtual machine instance), a particular type of virtual computing resource, a particular class of virtual computing resources, a computing network, traffic from a geographic area, and the like. Services of the computing resource service provider and/or the client that receive and evaluate requests by end users to access a virtual computing resource may use the security policy to determine whether to grant the requested access to the requesting user. In one example, the client may apply a security policy to a class of virtual computing resources; if the various components of the computing system are configured correctly, instances of the class are deployed with the specified security policy attached thereto (i.e., associated with, and controlling access to, the instance). Such a security policy is said to be a "resource" security policy because it may attach directly to certain resources, and may further be defined within a configuration (e.g., a template) applied to a virtual computing resource at launch. Other security policies may attach to a user account, a user group, access requests having certain characteristics, and the like. For example, a client may manage access to its resources using custom and/or predefined "roles" that can be assumed by authenticated users and authorize a user to perform certain actions. Like the faulty network configuration, an error in the definitions of a security policy can allow or deny access to data or actions in contravention of the client's intents.

Structured documents such as the configuration and security policy examples should therefore be checked for security and other issues. Such documents can become complicated, as described by example below, and computing resource service providers strive to continuously improve evaluation tools and techniques to simplify validation processes for their clients. As described briefly above, a class of constraint solvers is an emerging tool that can be particularly effective at determining the effects and limitations of structured documents that processors use to control system operations, provided the structured document can be represented as a logic problem that the constraint solver is configured to solve. Generally, a constraint solver specifies an input format that defines the logic problem so that the constraint solver can apply certain semantic reasoning theories to the input to solve the logic problem. For example, a satisfiability modulo theories (SMT) solver, such as Z3 and CVC4, evaluates a propositional logic formula comprising a set of constraints on the corresponding values of a set of properties (e.g., configuration parameters) to determine whether the formula is "satisfiable"—i.e., that there is a set of property values that satisfies all of the constraints.

There are some types of problems that constraint solvers struggle or fail to handle. Such struggles might be overcome if a constraint solver, its language/format, or its underlying theories could be adapted to better understand a particular problem type. However, off-the-shelf constraint solvers remain very difficult to use, and provide few configurable settings; no existing solver enables a user to modify the theories themselves, for example. For all practical purposes, only the software development team can improve a constraint solver's handling of a specific type of problem. It would be advantageous to generate a benchmark of problems having the problem type that could be handed to the developers of the solvers. This would enable them to improve the underlying theories based on a set of example problems generated from policies.

The present disclosure provides systems and methods for automatically transforming structured documents of a document type to produce logic problems, and delivering a data set of example problems to a constraint solver developer so that the developer can refine the constraint solver to improve the constraint solver's ability to evaluate the validity of structured documents of the document type. In particular, an embodiment of the provided system implements automated methods for parsing a security policy into its encoded permissions (i.e., principal user, action requested, resource to be accessed, and conditions to be satisfied by the request) and then generating logic problems comprising a set of constraints, in the constraint solver's format, that correspond to the permissions. The system may produce many (e.g., thousands or tens of thousands of) logic problems representing the structured document type. In some implementations, some or all of the source structured documents may be provided to the system by users of a computing resource service provider, or the system may obtain the source documents from user data stores if authorized. For example, the system may obtain thousands of actual security policies written and/or deployed by thousands of different users, and may transform them into corresponding logic problems in order to enable the developers to characterize the security policy document type.

However, certain types of users' actual source documents are likely to contain private, proprietary, secure, personally-identifying, or otherwise sensitive information such as account IDs, IP addresses, resource identifiers, and other information. The system must anonymize the data in the source documents as part of the conversion process. While software tools for anonymizing security policies and other types of structured documents exist, such known tools do not preserve the structure of the document as it pertains to the relationships between parameters. If the document structure is destroyed, the system cannot reliably transform the anonymized document into a logic problem that correlates to the original document; for example, the system may derive an incorrect set of constraints, such that the resulting propositional logic formula does not produce the solution(s) from the constraint solver that a formula generated from the original document produces. Thus, the system provides new anonymization tools and modifications to existing anonymization tools that account for the document structure, as described below.

Generally, the system provides a multi-stage anonymization of a structured document while transforming the structured document to produce a logic problem for evaluation by a constraint solver; the system may further verify that the anonymization preserves the structure of the document by executing the constraint solver against both the anonymized logic problem and an original logic problem produced from the original structured document, to determine whether the constraint solver produces the same result in about the same amount of computing time. Taking the structured document as input, the system performs a first-stage broad anonymization of sensitive data. For example, the system may store a database record or another data structure associated with the document type and containing data identifying the fields/parameters in the structured document that are likely to contain sensitive data, and/or that contain system data that should not be anonymized; the system may extract the corresponding parameter/value pairs from the structured document and anonymize the sensitive values while leaving system values unchanged. In non-limiting examples of the first-stage anonymization: account numbers may be replaced with artificial sequential identifiers; resource paths, such as system region and service names, are checked against a list of public/system names and anonymized if they do not match; and, IP addresses are fuzzed structurally to preserve subnet relationships.

During or after the first-stage anonymization, the system may reconstitute the anonymized data and unmodified data back into an anonymized structured document of the corresponding type. For example, the system may anonymize a set of permission statements in a security policy and then generate an anonymized security policy comprising the anonymized permission statements. The system then encodes the input document and the anonymized structured document into corresponding logic problems. For example, the system may identify a set of permissions in a security policy, convert each permission into one or more propositional logic formulae each comprising a set of logical constraint statements (e.g., representing string and regular expression constraints) in the constraint solver's language, and assemble the corresponding formulae into a logic problem. The system may feed the original and anonymized logic problems into the constraint solver and compare the solver output to confirm that the structure, satisfiability, and difficulty of the problem posed by the original structured document remain intact.

If the solver produces a different result for the anonymized logic problem, or solves the problem much faster or slower, compared to the original logic problem, the system may determine that the instance of the anonymized logic problem is not satisfactory, because satisfiability and/or structural integrity of the original structured document has not been preserved. The system may then perform a second-stage anonymization on the logic problem generated from the anonymized structured document. The second stage may be a set of context-aware transformations of string constants in the logic problem. In some embodiments, the system may compare the unsatisfactory logic problem to the original logic problem to identify the differences between them; then, using a set of instance requirements that describe the document structure, the system may determine one or more intermediate modifications to the anonymization that preserve the document structure. In some embodiments, the transformation may be applied to the entire problem, taking every string constant in the instance into account, while maintaining the structural relationships represented by the constraints. The system may iteratively perform the second-stage anonymization to obtain new random instances for testing.

Once one or more satisfactory anonymized logic problems is/are obtained, the system can add the instance(s) to a set of problems that is being stored and/or prepared for transmission to the constraint solver developers. In accordance with the following detailed description, a satisfactory anonymized logic problem exhibits correct anonymization and preserves the structure of the original document; by preserving the structure, the problem also preserves the satisfiability state of the original logic problem and the difficulty level of solving the original problem. Correct anonymization means anonymization of any sensitive information in the original policy is performed correctly in order for security objectives to be met; given the output encoding from the system, it is not possible for a user to reconstruct any of the original strings in the input that were anonymized. Preserving structure means that the anonymized instance is still semantically similar to the original instance. Preserving the satisfiability state means that the system only performs transformations that maintain the satisfiability (or unsatisfiability) of the original instance. Preserving the difficulty of the instance means that the system does not perform transformations that make the instance too easy or too hard to solve; this is shown, for example, by benchmarking the instance before and after anonymization on a representative solver or set of solvers, and comparing the time taken to solve.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

Figure 1B:
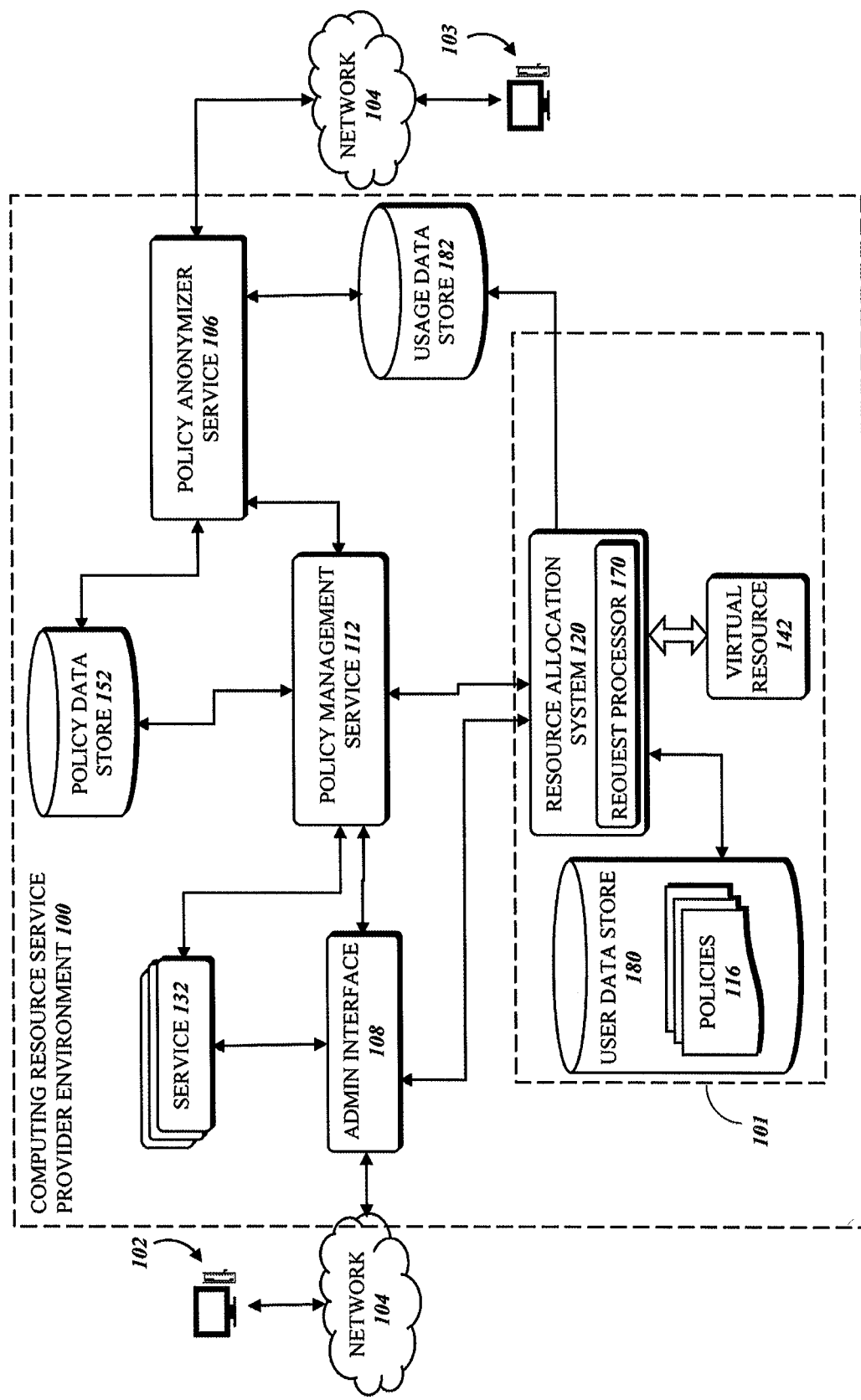

Referring to FIGS. 1A-B, embodiments of the present disclosure may operate within or upon computing systems of a computing resource service provider environment 100 accessible by users of user computing devices 102, 103 via a computer network 104 such as the internet. FIG. 1A illustrates the conceptual operation of the present systems and methods in interaction, via computing device 102, with a "client," or administrator of the virtual computing resources associated with a user account of the client. The environment 100 illustrates an example in which a policy anonymizer service 106 takes a first security policy 154 as input, generates from the first security policy 154 a second security policy 156 in which data of the first security policy 154 is at least partially anonymized, and then analyzes the security policies 154, 156 to determine, in terms of the relative permissiveness of the policies and based on the amount of time needed to perform the analysis and other factors, whether the security policies 154, 156 are equivalent.

In some embodiments, the client may submit a first security policy 154 to the computing resource service provider for validation. For example, the client may have a "policy tester" role and may want to know all of the different constraints (and loopholes) that are encoded into the policy 154. In other embodiments, the first security policy 154 may have been previously uploaded and deployed, and the policy anonymizer service 106 may obtain the policy 154 from a user data store (see FIG. 2). The policy 154 may be processed by an anonymized policy generator 168 that transforms the data in the first security policy 154 to produce a second security policy 156 in which at least some of the sensitive data in the first security policy 154 has been anonymized.

A security policy may be information (e.g., encoded in a file) that specifies one or more security permissions. Security permissions may be elements of the security policy that define access rights associated with resources and/or principals of a system. For example, a permission may be used to grant or deny access to computing resources of a computing resource service provider. Policies may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure. A security policy may include one or more permission statements as well as additional information such as versioning information and policy-wide information. In some cases, policy-wide information is included in a policy header at the beginning of a policy or may even be stored separately from (and in association with) a policy document. A policy may include multiple policy statements, such as those described elsewhere in connection with FIG. 2.

The policy anonymizer service 106 may be a service of a computing resource service provider. The policy anonymizer service 106 may be implemented using hardware, software, and a combination thereof. In some cases, the policy anonymizer service 106 supports one or more APIs that a client (e.g., the client computing device 102) or a constraint solver developer (e.g., the developer computing device 103) may use to provide requests to the policy anonymizer service 106. The policy anonymizer service 106 may support one or more APIs that are used to evaluate security policies, such as an API to determine whether a first security policy 154 is more permissive than a second security policy 156, and an API to generate and/or obtain anonymized security policies or the propositional formulae 186 generated therefrom as described below.

In some embodiments, permissiveness is used to describe the grant of access to resources. For example, if a first policy grants access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both grant access to the same resources and deny (either implicitly or explicitly) access to the same resources. In some cases, equivalency may refer to two policies explicitly granting access to the same resources and explicitly denying access to the same resources—in other words, if a first policy explicitly denies access to a computing resource and a second policy implicitly denies access to a computing resource (e.g., by not affirmatively granting access in a deny-by-default context) may lack equivalency in some embodiments. Generally, speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable. It should be noted that unless otherwise specified, examples described herein may implement a deny-by-default security model in which access to a computing resource is denied unless there exists an explicit grant of access to the computing resource. One measure of equivalency and/or "substantial similarity" is to determine whether a constraint solver that evaluates the logic problems representing the first and second security policies produces the same output for both evaluations. For example, if a model that satisfies a first logic formula derived from the first security policy does not satisfy a second logic formula derived from the second security policy, the security policies are not equivalent. Another measure of equivalency and/or "substantial similarity" is a determination that the constraint solver takes approximately the same amount of time to evaluate the logic problems associated with the first and second security policies. If it takes considerably more or less time to evaluate a logic problem for the second security policy than it does to evaluate a logic problem for the first security policy, the second security policy may be more or less (respectively) difficult or complex than, and therefore not equivalent to, the first security policy.

The policy anonymizer service 106 may be used to generate anonymized propositional formulae 186 that describe the structure, contents, and permissiveness of a security policy 154 but do not contain or reference any sensitive data contained or referenced in the security policy 154. The policy anonymizer service 106 may include multiple components and/or modules such as a policy parser 160; a propositional logic translator 162; a constraint solver 164 or multiple constraint solvers; an anonymized policy generator 168; a string logic anonymizer 166; and a solver output comparator 170. In some embodiments, the functions of various components and/or modules may be delegated to other services with which the policy anonymizer service 106 may utilize. For example, the policy anonymizer service 106 may, in some embodiments, utilize a different service for performing functionality related to parsing policies.

The anonymized policy generator 168 may generate an anonymized security policy 156 and/or anonymized permission statements 176 as described above; this/these may be delivered to the policy parser 160. Additionally, in some embodiments the anonymized security policy 156 may be sent (by the anonymized policy generator 168 or another component) to the developer device 103. The policy parser 160 may be a component or module that receives a security policy (e.g., a security policy received from a client in connection with an API call or obtained via a policy management service) and obtains one or more permission statements from the policy. For example, if the client provides a first policy 154 to the policy anonymizer service 106 and a (partially anonymized) second policy 156 is generated as described below, the policy anonymizer service 106 may use the policy parser 160 to obtain a first set of permission statements 174 from the first policy 154 and a second set of permission statements 176 from the second policy 156. The permission statements 174, 176 may each be associated with the granting or denying access to computing resource. The permission statements 174, 176 may be in a particular format such as JSON, Aspen, and more. In some embodiments it is expected that, if the anonymization of the first policy 154 to produce the second policy 156 is correctly done to preserve the policy structure, the policy parser 160 will identify and obtain the same number of permission statements 174, 176 from the two policies 154, 156, and the content of the second set of permission statements 176 will be the same as the content of the first set of permission statements 174 except that any sensitive data of the first set of permission statements 174 will be obscured/anonymized in the second set of permission statements 176.

In some embodiments, the permission statements 174, 176 may be passed to a propositional logic translator 162. The propositional logic translator 162 may receive a permission statement (e.g., in JSON format) and convert the permission statement into one or more constraints described using a solver language. In various embodiments, the solver language may follow principles of first-order logic, such as non-quantifier first-order logic and/or propositional logic. As described herein, propositional logic may refer to a symbolic logic that relates to the evaluation of propositions that may evaluate to either being true or false. Propositional logic may be utilized to evaluate the logical equivalence of propositional formulas. A propositional formula may be a statement in accordance with a syntax that includes propositional variables and logical connectives that connect the propositional variables. Examples of logical connectives or logical operators may include: "AND" (conjunction), "OR" (disjunction), "NOT" (negation), and "IF AND ONLY IF" (biconditional) connectives. Propositional logic may also be described herein as a "propositional expression" or a "propositional logic expression." In some embodiments, first-order logic may be utilized in place of propositional logic. First-order logic may refer to a formal system that utilizes quantifiers in addition to propositional logic. Examples of quantifiers include "FOR ALL" (universal quantifier) and "THERE EXISTS" (existential quantifier). Unless explicitly noted, embodiments of this disclosure described in connection with propositional logic may also be implemented using first-order logic—for example, in some embodiments, a first-order logic translator (not shown in FIG. 1) may be utilized in place of a propositional logic translator 162 to translate permission statements to first-order logic expressions and a constraint solver may evaluate one or more first-order logic expressions to determine whether the expressions are equivalent.

The constraints may be described in various formats and in accordance with various standards such as SMT-LIB standard formats, CVC language, and Center for Discrete Mathematics and Theoretical Computer Science (DIMACS) formats. For example, a permission statement (e.g., a permission statement included as part of a security policy) may be described as:

"Statement": [
{
"Effect": "Allow",
"Resource": *,
"Principal": *,
"Action": "put*"
}]

The corresponding propositional logic constraints may be generated from the example policy statement may be described as:

(assert policy.statement.resource)
(assert policy.statement.principal)
(assert (=policy.statement.action (or (and (="storage" actionNamespace) (str.prefixof "put" actionName)))))
(assert (=policy.statement.effect.allows (and policy.statement.action policy.statement.resource policy.statement.principal)))
(assert (not policy.statement.effect.denies))
(assert (=policy.allows (and (not policy.denies) policy.statement.effect.allows)))
(assert (=policy.denies policy.statement.effect.denies))

The propositional logic expressions generated by the propositional logic translator 162 may represent a set of constraints that must be satisfied for the corresponding permission statement to be in effect. The constraints described above correspond to a set of constraints that are necessarily satisfied if the preceding permission statement allowing access to APIs starting with "put" (e.g., "put-object") to be fulfilled. In some embodiments, a first logic problem 184 may be generated from the first set of permission statements 174 and a second logic problem 185 may be generated from the second set of permission statements 176. The propositional logic expressions may be expressed in a language in accordance with a SMT-LIB standard language such as the STM-LIB 2.0 standard, in some embodiments.

A constraint solver 164 may be used to evaluate propositional logic expressions and similar/related logic problems, such as the original logic problem 184 and the first anonymized logic problem 185, to produce corresponding outputs 194, 195 representing the results of the evaluations. The constraint solver 164 may be hardware, software, or a combination thereof. For example, the constraint solver 164 may be an executable copy of the constraint solver that the developers are developing, which may be an off-the-shelf constraint solver such as Z3 or CVC4. In various embodiments, the outputs 194, 195 may be used to determine whether the logic problems 184, 185 are equivalent or one corresponding set of constraints is more permissive and/or more difficult to solve than the other. The constraint solver 164 may generate additional propositional logic constraints as part of determining whether the first logic problem 184 is equivalent to the second logic problem 185.

In some embodiments, the constraint solver 164 utilizes the following constraints to determine whether a first policy (e.g., policy A) is equivalent to a second policy (e.g., policy B):

(assert (or policyB.neutral policyB.denies))
(assert policyA.allows)

The constraints may be generated and evaluated in addition to constraints of the first logic problem 184 and the second logic problem 185, which may be encoded in the manner described above. The constraints may be generated based at least in part on what a client requests. For example, the constraint solver 164 may generate constraints that are satisfied only under circumstances where a first policy grants access to a resource and a second policy denies access to the resource or is neutral regarding the resource in response to a request from a caller (e.g., the policy anonymizer service 106) to determine whether a first propositional logic expression is more permissive than a second propositional logic expression. Such an embodiment may be implemented in a deny-by-default context where a neutral context (i.e., a context where no permission explicitly grants or denies access to a particular resource). In an allow-by-default context, the constraint solver 164 may generate different constraints that are satisfied where the first policy grants access to a resource or is neutral regarding the resource and the second policy does not deny access to the resource.

The constraint solver 164 may be used to verify whether the propositional logic constraints (e.g., those obtained from the first and second logic problems 184, 185 and those generated by the constraint solver 164) are equivalent. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In some embodiments, the constraint solver may be implemented at least in part using a satisfiability modulo theories (SMT) constraint solver to determine whether a formula is satisfiable. An example of a SMT-based constraint solver is Z3. Other types of solvers may be utilized in accordance with the techniques described herein as part of implementing a constraint solver including but not limited to satisfiability (SAT) solvers and binary decision diagrams (BDD) solvers. The constraint solver 164 may generate an equivalence result that indicates whether the formula is satisfiable and, by extension, whether two or more policies are equivalent. In some embodiments, an equivalence result is made available to another computing entity, such as the client computing device 102 that issued a request, a system administrator, and other computing entities.

In other embodiments, rather than itself determining equivalence, the constraint solver 164 may generate the outputs 194, 195, which are received by a solver output comparator 170. For example, the output 194 representing the result of evaluating the original logic problem 184 may be generated substantially earlier in time than the output 195, such as when the client 102 first submits the first security policy 154 to the computing resource service provider; the output 194 may be stored in a data store. Later, the policy anonymizer service 106 may be called to produce an anonymized logic problem representing the first security policy 154; the solver output comparator 170 may retrieve the output 194 from storage and compare it to the output 195 once the latter is generated. The solver output comparator 170 may determine equivalence or substantial similarity of the logic problems 184, 185, and may report a determination to the string logic anonymizer 166. In some embodiments, the solver output comparator 170 may determine that that the anonymized logic problem 185 is substantially similar to the original logic problem 184, and can be used to represent the first security policy 154, if the solution sets in both outputs 194, 195 are the same and the processing time for the anonymized logic problem 185 is within a predefined margin of error of the processing time for the original logic problem 184.

In some embodiments, the string logic anonymizer 166 may receive the original logic problem 184 generated from the non-anonymized permission statements 174 and the anonymized logic problem 185 generated from the anonymized set of permission statements 176 (i.e., the permission statements obtained from the anonymized security policy 156). For example, the string logic anonymizer 166 may determine (e.g., based on a received signal from the comparator 170) that the compared outputs 194, 195 are not equal, and may obtain the logic problems 184, 185 from the logic translator 162 or from storage. Where the anonymized policy generator 168 provides a first-stage anonymization of data in certain fields that are known to contain sensitive data, the string logic anonymizer 166 provides a second-stage anonymization of remaining sensitive data by applying one or more algorithms to the logic problem 185 to "fuzz" every string constant in the logic problem 185, anonymizing the value(s) of the string constant(s) while retaining the internal representation of the document structure. Additionally, the string logic anonymizer 166 preserves satisfiability while anonymizing (to the extent possible) string constants in the logic problem 185. Details of example algorithms for anonymizing the string constants in this manner are provided below.

The string logic anonymizer 166 produces one or more anonymized logic problems 186 that may be passed to the constraint solver 164, which executes against the one or more logic problems 186 to produce one or more corresponding outputs 196; the output(s) 196 is/are compared to the output 194 of evaluating the original logic problem 184, as described above. In some embodiments, the string logic anonymizer 166 may apply one or more instance requirements 192 describing the document structure in light of the conversion of the structured document (i.e., the security policy 154) into a logic problem 184. If it is determined that the anonymized logic problem 186 is equivalent or substantially similar to the logic problem 184 derived from the first security policy 154, the string logic anonymizer 166 may send the logic problem 186 to the developer computing device 103, or add the logic problem 186 to a set 188 of anonymized logic problems sent to the developer and/or later accessed by the developer computing device 103. In some embodiments, the anonymization algorithms may randomly generate data for use as anonymization data (i.e., strings to replace strings in the non-anonymized expression 185); if it is determined that the anonymized logic problem 186 is neither equivalent nor substantially similar to the logic problem 184, the string logic anonymizer 166 may re-execute the algorithms against any or all of the previously generated logic problems 184-186 to produce a different anonymized logic problem that can be evaluated, and this can be repeated until a suitable anonymization is identified.

FIG. 1B illustrates a computing architecture in which a client may access the computing systems of the computing resource service provider environment 100 (e.g., using the client's user account credentials) using a computing device 102 to connect to a first user interface 108; a constraint solver developer, using a computing device 103 connected to the internet 104, may access the computing environment 100 to communicate with the policy anonymizer service 106 and obtain any anonymized logic problems generated as described herein; alternatively, the developer may access a data store 152 or data storage service in the computing environment 100, or the policy anonymizer service 106 may send the anonymized logic problems to the developer device 103 or to a data store external to the computing environment 100.

The computing resource service provider implements, within its computing environment 100, at least one virtual computing environment 101 in which users may obtain virtual computing resources that enable the users to run programs, store, retrieve, and process data, access services of the computing resource service provider environment 100, and the like. The virtual computing environment 101 may be one of any suitable type and/or configuration of a compute resource virtualization platform implemented on one or more physical computing devices. Non-limiting examples of virtual computing environments 101 include data centers, clusters of data centers organized into zones or regions, a public or private cloud environment, and the like. The virtual computing environment 101 may be associated with and controlled and managed by the client (e.g., via the user interface 108). In some embodiments, the virtual computing environment 101 of a particular client may be dedicated to the client, and access thereto by any other user of the computing resource service provider environment 100 prohibited except in accordance with access permissions granted by the client, as described in detail herein.

The computing resource service provider environment 100 may include data processing architecture that implements systems and services that operate "outside" of any particular virtual computing environment and perform various functions, such as managing communications to the virtual computing environments, providing electronic data storage, and performing security assessments and other data analysis functions. These systems and services may communicate with each other, with devices and services outside of the computing resource service provider environment 100, and/or with the computing environments. It will be understood that services depicted in the Figures as inside a particular virtual computing environment 101 or outside all virtual computing environments may be suitably modified to operate in the data processing architecture in a different fashion that what is depicted.

In general, the user computing devices 102, 103 can be any computing device such as a desktop, laptop, mobile phone (or smartphone), tablet, kiosk, wireless device, and other electronic devices. In addition, the user computing devices 102, 103 may include web services running on the same or different data centers, where, for example, different web services may programmatically communicate with each other to perform one or more techniques described herein. Further, the user computing devices 102, 103 may include Internet of Things (IoT) devices such as Internet appliances and connected devices. Such systems, services, and resources may have their own interface for connecting to other components, some of which are described below. Although one or more embodiments may be described herein as using a user interface, it should be appreciated that such embodiments may, additionally or alternatively, use any CLIs, APIs, or other programmatic interfaces.

A network 104 that connects a user device 102 to the computing resource service provider environment 100 may be any wired network, wireless network, or combination thereof. In addition, the network 104 may be a personal area network, local area network, wide area network, over-the-air broadcast network (e.g., for radio or television), cable network, satellite network, cellular telephone network, or combination thereof. In some embodiments, the network 104, may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Accordingly, a user of a user device 102 may access the computing resource service provider environment 100 via a user interface 108 which may be any suitable user interface that is compatible with the user device 102 and the network 104, such as an API, a web application, web service, or other interface accessible by the user device 102 using a web browser or another software application, a command line interface, and the like. In some embodiments, the user interface 108 may include code and/or instructions for generating a graphic console on the user device 102 using, for example, markup languages and other common web technologies. An administrative user interface 108 may, via the connecting device 102, present a user with various options for configuring, requesting, launching, and otherwise operating virtual computing resources in one or more of the computing environments 101. User input (e.g., text, computer files, selected elements from a list or menu, mouse clicks on buttons, and other interactions) entered into the user interface 108 by the user may be received and processed by one or more components of the computing resource service provider environment 100, such as a policy anonymizer service 106, a policy management service 112, and/or one or more components in the computing environment 101, such as a resource allocation system 120.

For example, the client may use the user interface 108 to configure a virtual network, launch virtual computing resources 142 and connect them to the virtual network and/or the external communication network 104, and create security policies 116 that govern how end users can access the virtual computing resources. Such processes may generate records describing the client's and/or end users' user accounts and store the user account records in a user data store 180. The records may include information indicating that and end user associated with the user account is authorized or approved to request and use virtual computing resources in the computing environment 101. The information may describe limitations on the end user's ability to use virtual computing resources. For example, user account information may specify the types of virtual computing resources the end user is allowed to request and/or the actions (e.g., read, write, copy) the end user is allowed to perform. The client may further input other configuration settings that the system may later use to perform security assessments of virtual computing resources in accordance with the present disclosure.

A computing environment 101 may be configured to provide compute resources to users that are authorized to use all or part of the computing environment 101. Compute resources can include, for example, any hardware computing device resources, such as processor computing power/capacity, read-only and/or random access memory, data storage and retrieval systems, device interfaces such as network or peripheral device connections and ports, and the like. In some embodiments, these resources may be dispersed among multiple discrete hardware computing devices (e.g., servers); these hardware computing devices may implement or communicate with a virtualization layer and corresponding virtualization systems (e.g., a hypervisor on a server), whereby the compute resources are represented by, and made accessible as, virtual computing resources. A virtual computing resource may be a logical construct, such as a data volume, data structure, file system, and the like, which corresponds to certain compute resources. Non-limiting examples of virtual computing resources include virtual machines and containers (as described below), logical data storage volumes capable of storing files and other data, software programs, data processing services, and the like.

The computing environment 101 may be configured to allocate compute resources of corresponding hardware computing devices by virtualizing those resources to produce a fixed or variable quantity of available virtual computing resources. The available resources may be provided in a limited manner to one or more users that submit requests for virtual computing resources within the computing environment 101; such resources that are allocated to and/or in use by a particular user are represented by virtual resources 142. Various functions related to processing requests to use virtual resources, to otherwise managing the allocation and configuration of the available resources and allocated virtual resources 142, and to limiting the amount of virtual resources 142 that are allocated to a particular user in accordance with the present systems, may be performed by one or more services executing within the computing environment 101 and/or outside of it (i.e., in the data processing architecture of the computing resource service provider environment 100). For example, security policies 116 may include a resource security policy that is applicable to the resource type associated with a virtual resource 142, and services 132 processing requests to access the virtual resource 142 may use the resource security policy to determine whether the request should be allowed or denied.

In some embodiments, as illustrated in FIG. 1B, a resource allocation system 120 operating within the computing environment 101 may cooperate with security policy management service 112 implemented outside of the computing environment 101 to manage the allocation of virtual resources according to security policies. In some embodiments, the resource allocation system 120 receives at least the communications that contain requests, commands, instructions, and the like (collectively herein, "requests"), to allocate, launch, execute, run, or otherwise provide, for use by an identifiable user (e.g., the requesting user or another specified user), one or more virtual computing resources in the computing environment 101. The request received by the policy anonymizer service 106 may be generated directly by the client (e.g., using the administrative user interface 108) or by a connected end user (e.g., using the user interface 110), or the request may be generated as, or in response to, an output (e.g., a trigger event message) of another component of the computing resource service provider environment 100 or of an external device.

The resource allocation system 120 may include one or more services, implemented in software or hardware devices, for performing pertinent tasks. In some embodiments, the resource allocation system 120 may include a request processor 170 which is configured by executable program instructions to receive a request for virtual computing resources, parse the request into delivery and other parameters, determine whether the request can be fulfilled, and if the request can be fulfilled, provide a virtual computing resource 142 configured for use according to the parameters of the request. The request processor 170 may additionally be configured to send the request, or some or all of the data contained in the request or describing the request, to the policy management service 112 or the usage data store 182 for associated processing by the policy anonymizer service 106 as described herein. The request processor 170 or another component of the resource allocation system 120 may be configured to send to the user interface 108 information related to processing the request, such as error, completion, and other status messages.

The resource allocation system 120 may additionally collect and/or generate usage data describing aspects of the virtual computing resource 142. Non-limiting examples of such usage data may include: configuration and/or status parameters of the virtual computing resource 142 at the time of launch or failure to launch; information related to the processing of a request to use virtual computing resources; monitoring data collected by monitoring virtual computing resource 142 operations, such as network communications, data storage and retrieval and other disk access operations, execution of software programs, and the like; and, state data such as a snapshot of the state of the virtual computing resource 142 at the time it is provisioned, deploys, terminates, fails, or generates an error, or at any other time. The usage data may be stored in a usage data store 182 of the computing resource service provider environment 100. Additionally or alternatively, the usage data store 182 for a computing environment 101 may be implemented within the computing environment 101 itself. The usage data stored in the usage data store 182 may be accessible only to the client, or may be accessible by certain other systems and/or services. For example, the policy anonymizer service 106 may, by default or by user authorization, access and use the usage data of one user or multiple users to update or interpret a model of a security policy as described further below.

In some embodiments, a policy data store 152 may include security policies stored by the provider, such as best practices policies. Such policies may additionally or alternatively include anonymized security policies generated by the policy anonymizer service 106.

Figure 2:
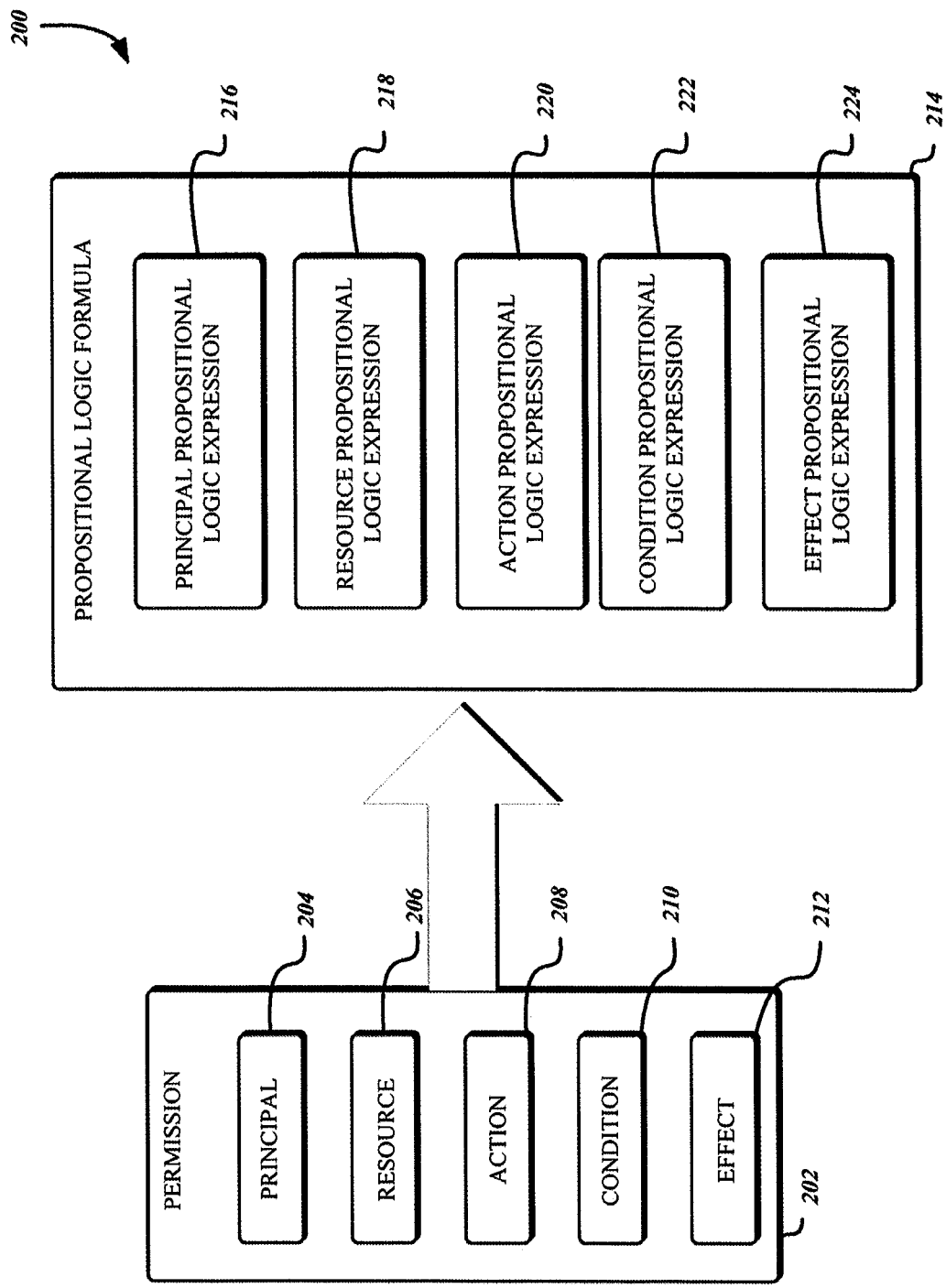
FIG. 2 is a diagram illustrating an example conversion of a permission from a security policy into a propositional logic formula.

FIG. 2 shows an illustrative example of a diagram 200 in which a security permission and a corresponding propositional logic expression are shown. The permission 202 illustrated in FIG. 2 may be one of a plurality of security permissions specified in a security policy, such as security policies described elsewhere in connection with FIG. 1.

Diagram 200 illustrates an example of a permission 202 which may be associated with a computing resource policy. In some embodiments, a permission 202 may specify a principal 204, a resource 206, an action 208, a condition 210, and an effect 212. In some embodiments, a permission 202 may also specify a plurality of one or more of these elements such as, for example, a set or class of users, a collection of resources, several different actions, and/or multiple conditions. In some embodiments, the permission 202 may specify one or more wildcard or otherwise modifiable characters that may be used to denote that the permission 202 may be modified to make the permission 202 applicable to different users and their associated resources. Wildcards may be represented in various formats—for example, an asterisk may represent any number of characters and a question mark may represent any single character. In some embodiments, the policy may be expressed in a language independent format such as JavaScript Object Notation (JSON). Examples discussed in this disclosure may be in JSON format or in a format similar to JSON and as illustrations of various embodiments which may be implemented. Of course, various other formats which may be utilized in the manner described in connection with JSON and JSON-like formats are also contemplated and within the scope of this disclosure.

The principal 204 may be a user, a group, an organization, a role, or a collection and/or combination of these or other such entities. A principal 204 may be any entity that is capable of submitting API calls that cause an action associated with a resource to be performed and/or any entity to which permissions associated with a resource may be granted. As an example, a permission 202 may have a principal 204 element specified in the following manner:

"Principal": "rn:ws:iam::ducksfan8"

In some embodiments, the principal 204 is identified by a resource name that uniquely identifies the principal 204. A principal 204 may include one or more name spaces that include additional information regarding the principal. For example, "rn" may refer to a resource name prefix and identifies the subsequent information as part of a resource name; "ws" may refer to a partition namespace that the resource is in; "iam" may refer to a service namespace that identifies a service of a computing resource service provider (e.g., the computing resource service provider may provide services related to identity and access management); namespaces may additionally be omitted (note that there are two semicolons in the example above between "iam" and "ducksfan8")—in some formats and/or for some resources, a region namespace may be option; and "ducksfan8" may refer to an identifier for the account, such as the account that owns the resource 206 specified in the permission 202.

The resource 206 may refer to a computing resource of a computing resource service provider. Computing resources of a computing resource service provider may include: compute resources (e.g., virtual machine instances); storage resources (e.g., scalable storage, block storage, and managed file storage systems); database systems (e.g., managed relational database systems); migration services (e.g., applications, services, and hardware for streamlining the transfer of data from one physical data center to another); network and content delivery; developer tools; management tools; security, identity, and access management services; analytics services; artificial intelligence services; and more. Computing resources 206 may be organized in a hierarchy, and may use structures such as folders, directories, buckets, etc. to organize sets of computing resources into groupings. In some cases, policies and/or permissions may be applied directly to a bucket and grant cross-account access to an environment. As an example, a permission 202 may have a resource 206 element specified in the following manner:

"Resource": "rn:ws:storage:::bucket/Booker_ROY.png"

In some embodiments, the resource 206 is identified by a resource name that uniquely identifies the resource 204. In some cases, the resource 206 may share a same naming convention as the principal 204 or other elements of the permission. However, this need not be the case, as each separate element of a permission 202 may use a naming convention, namespace, format, etc. that is independent of other elements. In the example resource given above, "rn" may refer to a resource name prefix and identifies the subsequent information as part of a resource name; "ws" may refer to a partition namespace that the resource is in; "storage" my refer to a service namespace that identifies a service of a computing resource service provider (e.g., the computing resource service provider may provide services related to object-based storage); as discussed elsewhere, namespaces may be omitted in some cases—for example, a region namespace and/or account namespace may be omitted; and a resource which may also include an indicator of the type of resource. In the example above, the resource may indicate an image in the Portable Network Graphics (PNG) format and is stored in a bucket.

The action 208 may be the specific action or actions that will be allowed or denied by the permission. Different types of services (e.g., having different service namespaces) may support different actions. For example, an identity and account management service may support an action for changing passwords, and a storage service may support an action for deleting objects. An action may be performed in association with the resource and may, for example, be identified by a type of API call, a library call, a program, process, series of steps, a workflow, or some other such action. As an example, a permission 202 may have an action 208 element specified in the following manner:

"Action": "storage:GetObject"

In this example, the action that is allowed or denied (determined based on the effect 212 specified in the permission) corresponds to a storage service that supports an action (e.g., API call) for GetObject, which may be used in connection with obtaining an object and/or access to an object of a storage service. As discussed elsewhere, various namespaces may be used in connection with specifying an action. Wildcards may be used to specify multiple actions. For example, an action element described as "Action": "storage:*" may refer to all APIs supported by a storage service. As a second example, an action element described as "Action": "iam:*AccessKey*" may refer to actions supported by an identity and access management service in connection with access keys of a service—illustrative examples may include actions related to creating an access key (e.g., a "CreateAccessKey" action may exist), deleting an access key (e.g., "DeleteAccessKey"), listing access keys (e.g., "ListAccessKeys"), and updating an existing access key (e.g., "UpdateAccessKey").

The condition 210 element may be one or more conditions that specify when a policy is in effect. In some embodiments, the condition element is optional and may be omitted in some permissions. Conditions may be described as Boolean expressions that may be used to determine whether the policy is in effect (i.e., if the expression evaluates to TRUE) or not in effect (i.e., if the expression evaluates to FALSE). Policies that are not in effect may be unenforced or ignored by an authorization module (such as those described elsewhere in this). In some embodiments, conditions in a permission may be evaluated against values provided as part of a web API request corresponding to one or more APIs specified in the action 208 element. As an example, a permission 202 may have a condition 210 element specified in the following manner:

"Condition": {"DateLessThan": {"ws:CurrentTime": "2017-12-13"}}

In this example, the condition, the "ws:CurrentTime" value of the request is compared against a literal value "2104-12-13" using the condition operator "DateLessThan" which may be used to evaluate whether the condition is met. In this example, the condition may be true when the current time (e.g., the time the request is received by the service provider) is less than the supplied date of Dec. 13, 2014. It should be noted that the key value (in the example, the current time) may be compared not only against literal values, but policy variables as well. Various other types of condition operators may exist, which may be used for comparing string conditions, numeric conditions, Boolean conditions, binary conditions (e.g., testing values in binary format), IP address conditions (e.g., testing values against a specific IP address or range of IP addresses), and more. Conditions may, furthermore, include quantifiers. For example, a string condition may include an operator such as "StringEquals" that compares whether two strings are equal, and a similar operator may include a quantifier such that "StringEqualsIfExists" may be used to compare two strings when the key value exists in the context of an evaluation. Quantifiers may be used in conjunction with wildcards where multiple resources matching a wildcard expression may support different context keys. Such an example is discussed below in connection with FIGS. 5 11. In some embodiments, such as those where conditions include quantifier, first-order logic may be utilized rather than propositional logic.

An effect 212 may refer to whether the permission 202 is used to grant or deny access to the computing resources specified in the permission 202 in the resource 206 element. An effect 212 may be an ALLOW effect, which grants access to a resource, and a DENY effect, which denies access to a resource. In some embodiments, access to computing resources of a computing resource service provider are denied by default and a permission affirmatively including an ALLOW effect is required. As an example, a permission 202 may have an effect 212 element specified in the following manner:

"Effect": "ALLOW"

Accordingly, a permission statement that grants a particular principal (e.g., "rn:ws:iam::ducksfan8") access to call a storage service API (e.g., "storage:GetObject") and obtain a particular image (e.g., "rn:ws:storage:::bucket/Booker_ROY.png") when a specific condition is true (e.g., the API request is made prior to Dec. 13, 2016) may be specified in the following manner:

```
"Statement": [
{
  "Effect": "ALLOW",
  "Principal": "rn:ws:iam::ducksfan8",
  "Action": "storage:GetObject",
  "Resource": "rn:ws:storage:::bucket/MM4_Heisman.png",
  "Condition": {
    "DateLessThan": {
      "ws:CurrentTime": "2014-12-13"
    }
  }
}
[
```

It should be noted that the examples described above merely describe one of many ways in which permissions may be expressed. Of course, in other embodiments, variations on the principles described above in connection with FIG. 2 may be applied in various ways.

In some embodiments, elements may be described in inverse (e.g., negative) terms. An inverse element may be applied to all matches except for those specified in the element. For example, if a permission statement is described as "NotPrincipal: ducksfan8" then the permission statement applies to all principals except the particular principal or principals listed in the permission statement—in this case, the permission statement would apply to all principals except ducksfan8. An inverse element may be used in conjunction with the principal element (e.g., a "NotPrincipal" element would apply to all principals except those listed), the action element (e.g., a "NotAction" element would apply to all actions except those listed), the resource element (e.g., a "NotResource" element would apply to all resources except those listed), and so on.

As shown in FIG. 2, a permission 202 may be used to generate a propositional logic expression 214. A propositional logical expression 214 may comprise a set of logical expressions which represent the permission 202. Propositional logical expressions may be evaluated to determine whether a formula is satisfiable. For example, propositional logic may be used to determine whether it is satisfiable that a resource is allowed under a first propositional logical expression corresponding to a first security policy comprising a first set of permissions and the resource is not allowed (e.g., explicitly denied and/or not explicitly granted an ALLOW effect) under a second propositional logical expression corresponding to a second security policy comprising a second set of permissions. In some embodiments, the permission 202 statement may be used to generate a propositional logic expression 214. The principal 204 element may map to a principal propositional logic expression 216 which may comprise of statements in propositional logic and one or more assertions that are used as constraints on whether a formula is satisfiable. Likewise, the resource 206 element may map to a resource propositional logic expression 218, the action 208 element may map to an action propositional logic expression 220, the condition 210 element may map to a condition propositional logic expression 222, and the effect 212 element may map to an effect propositional logic expression 224. Various examples in connection with these mappings are described below.

Figure 3:
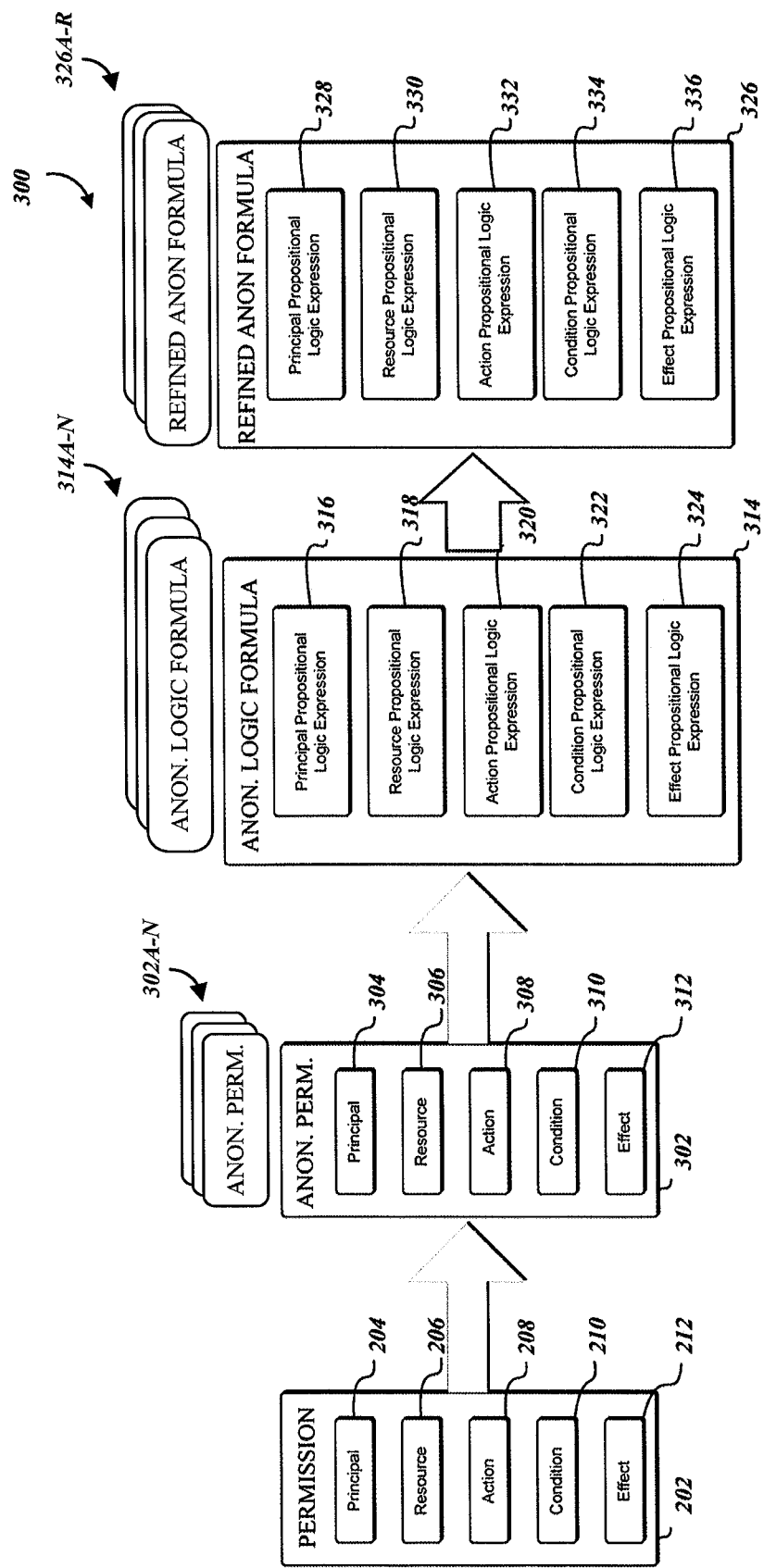
FIG. 3 is a diagram illustrating an example conversion of the permission of FIG. 2 into an anonymized propositional logic formula.

The diagram 200 of FIG. 2 demonstrates a transformation of a permission statement 202 into a propositional logic expression 214 as described above with respect to a non-anonymized security policy (e.g., first security policy 154 of FIG. 1A). FIG. 3 illustrates an example diagram 300 of transforming the same permission statement 202 into one or more anonymized logic formulae 326 as described above (e.g., logic problem 186 of FIG. 1A). The permission statement 202 may be transformed (i.e., by the anonymized policy generator 168 of FIG. 1A or another component) into at least a first anonymized permission statement 302. The anonymized permission statement 302 includes a principal 304, resource 306, action 308, condition 310, and effect 312 as in the original permission statement 202, except that the corresponding values of one or more of the elements may be partially or fully randomized. In some embodiments, the system may generate a plurality of anonymized logic formulate, and so the system may generate additional iterations 302A-N of an anonymized permission statement 302. The anonymized permission statement(s) 302, 302A-N may then be used to generate a corresponding number of anonymized logic formulae 314, 314A-N comprising a set of logic expressions which may comprise of statements in propositional or other first-order logic and one or more assertions that are used as constraints on whether a formula is satisfiable, as described above: the principal 304 element may map to a principal propositional logic expression 316, the resource 306 element may map to a resource propositional logic expression 318, the action 308 element may map to an action propositional logic expression 320, the condition 310 element may map to a condition propositional logic expression 322, and the effect 312 element may map to an effect propositional logic expression 324.

The propositional logic formulae 314, 314A-N may be validated against the original logic formula using a constraint solver as described above. Formulae that are valid (i.e., that preserve the structure and satisfiability of the security policy's permissions 202) may be added to a set of validated anonymized logic problems. Formulae that are not valid may be passed through second-stage anonymization, such as via application of anonymizing algorithms to some or all of the string constants (e.g., by string anonymizer 166 of FIG. 1A) to produce anonymized logic formulae 326, 326A-R having anonymized but semantically similar versions of a principal propositional logic expression 328, resource propositional logic expression 330, action propositional logic expression 332, condition propositional logic expression 334, and effect propositional logic expression 336. Thus, a plurality of anonymized logic problems that can be used for testing may be generated from a single security policy.

Figure 4:
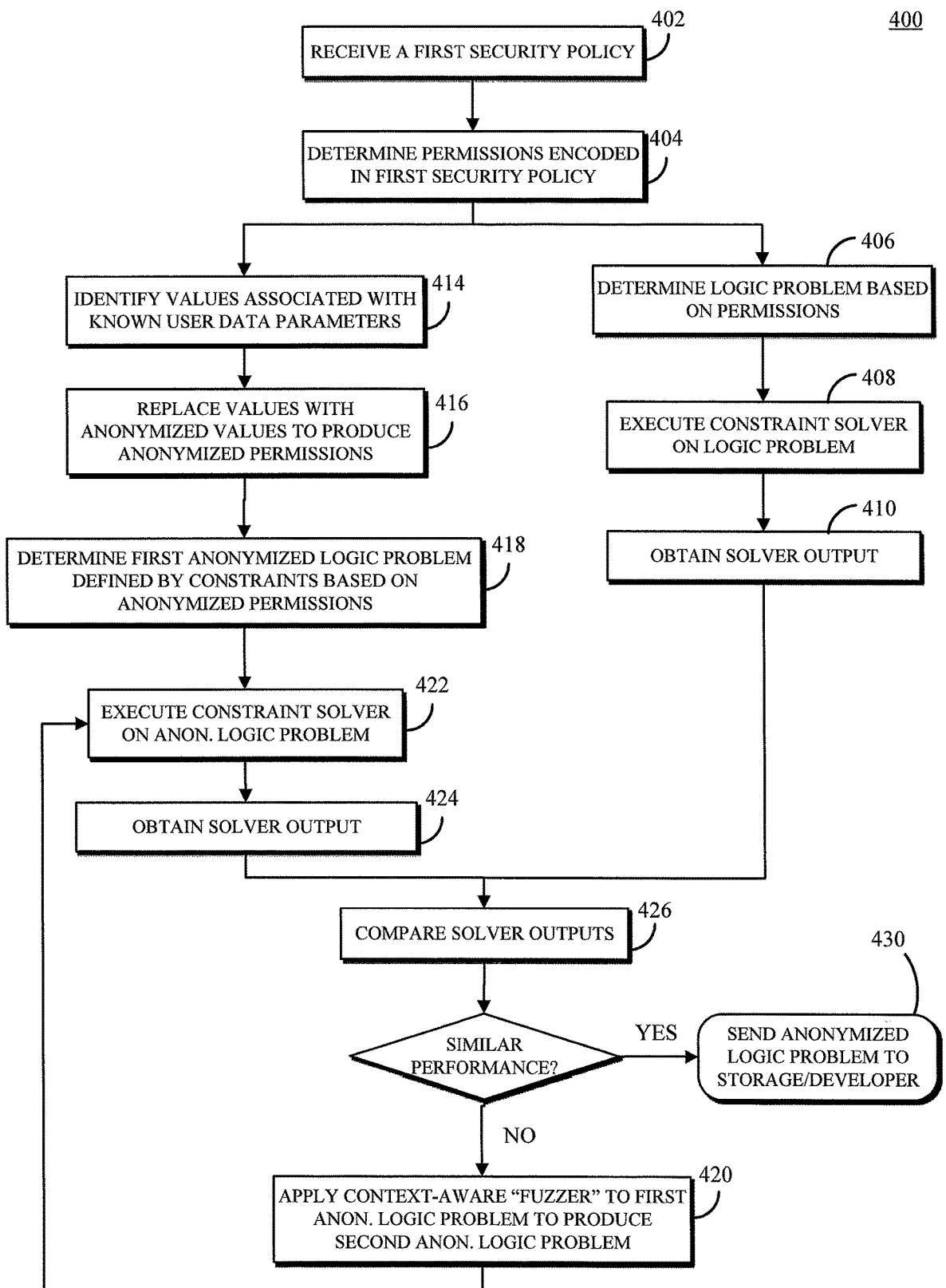
FIG. 4 is a flowchart of an example method of transforming a security policy into a corresponding propositional logic formula and one or more anonymized propositional logic formulae, in accordance with this disclosure.

FIG. 4 provides an example method 400 executable by a system, in accordance with the present disclosure, to generate an anonymized propositional logic formula representing a security policy. At 402 the system receives the policy, and then, before, concurrently with, or after generating the anonymized formula, the system may transform the security policy into a corresponding logic problem that is stored for later evaluation or immediately evaluated for validating the security policy, performing the present comparison (at 426), and/or other purposes. Thus, at 404 the system may determine the set of permission statements encoded in the first security policy, at 406 the system may determine the one or more propositional logic formulae that comprise the logic problem (optionally then storing the logic problem), at 408 the system may execute a constraint solver against the one or more formula(e) to evaluate the logic problem, and at 410 the system may obtain a first solver output comprising one or more results of the evaluation. The output or the corresponding results may be stored or retained (e.g., in volatile or non-volatile memory of the computing device(s) executing the constraint solver) for use in the subsequent comparison.

As illustrated, in some embodiments the system may perform the first-stage anonymization on the permission statement(s) identified in the security policy (at 404). Thus, at 414 the system may identify, within each of the permission statements, each parameter that is known to contain user data or other sensitive data that should be anonymized, and may obtain the corresponding value of each identified parameter. At 416 the system may replace each of the corresponding values with an anonymized value (e.g., a random number for an integer variable; for a string parameter, a replacement string at least partially comprised of groupings of random characters, but conforming to any structural requirements associated with the original parameter/value pair. Replacing the values with anonymized values produces anonymized permission statements. Alternatively, the system may perform the first-stage anonymization on the security policy document itself to produce an anonymized security policy, and may determine the anonymized permission statements from the anonymized policy, as described above with respect to FIG. 1A. To replace the original values, the system may, for example, generate a data set, data record, file, dynamic lookup table, or other data structure, for storing each anonymized permission and/or the anonymized policy comprised of the anonymized permissions; the data structure may include the same parameters as the non-anonymized permission statement(s), but may have the anonymized values stored as the corresponding values to the parameters.

At 418 the system may transform the anonymized permission statements to produce one or more logic problems each comprising one or more constraints identified from the relationships between permission statements; the logic problem composed from these formulae may be different from the logic problem generated at 406, insofar as it is generated from anonymized data instead of the original data in the policy. In some cases, the first-stage anonymization may not produce any anonymized data, or the anonymized data that is produced may not be relevant to the constraints identified by the system; the intermediate logic problem in such cases may be identical to the original logic problem derived from the policy (at 406).

In some cases, the propositional formula(e) of the anonymized logic problem may be completely anonymized after the first-stage anonymization; that is, all sensitive data and sensitive information about the policy structure is obscured by the broad value-replacement algorithm of the first stage. In these cases, a second-stage anonymization (at 420) is optional and may be skipped or executed only if needed (i.e., the comparison at 426 fails). In various embodiments, the anonymized logic problem may be fed into the corresponding constraint solver at 422, and at 424 the system may obtain the solver output. At 426 the system may compare the outputs of the solver (at 410 and 424) to determine whether the solver produces the same result with the same performance characteristics. If so, at 430 the system may send the anonymized logic problem to the developer and/or to data storage (e.g., adding the logic problem to a set that will be delivered to the developer).

Otherwise, at 420 the system may apply a second-stage anonymization to the propositional logic formula(e). In some embodiments, the system may execute a context-aware "fuzzing" algorithm to one, some, or all of the string constants in the propositional logic formula(e) to produce (an) anonymized propositional formula(e). Some fuzzing algorithms exist for transforming a value of a string constant by injecting random or semi-random sets of characters into the value to produce fuzzed values, but no known fuzzing algorithm is "context-aware" and thus enabled to preserve the structure of the document containing the strings being fuzzed as well as the satisfiability of the constraints in the document. Novel examples of context-aware string logic anonymization algorithms are provided herein.

The value substitution and transformation operations of the first- and second-stage anonymizations may be controlled to seek a balance of a sliding scale: on one extreme, substitute every string with an arbitrary string, which will certainly preserve privacy, but will likely not preserve satisfiability, document structure, or problem characteristics, likely leading to processing errors and/or trivial fail-SAT examples; on the other extreme, anonymization is performed only if the transformations are guaranteed equi-satisfiable (i.e., equivalent values for the original and anonymized parameters produce the same result), which may not satisfy data privacy requirements by leaving some sensitive data in the logic problem. In the middle ground are structure-preserving transformations. In some embodiments, some or all of these transformations may be determined using various formats that are understood by the computing resource service provider; the formats may identify constants and variables, as well as the required structure of corresponding values, but may not in and of themselves compromise customer data. Non-limiting examples include: resource identifiers, which may be numbers, strings, or data structures, and may have a format such as a set of internal parameter fields separated by a delimiting character (e.g., the resource identifier format "partition:service:region:account:resourcepath/resource" identifies the provider network partition, the provider service being called, the geographic region within the partition, the account identifier of the user that owns the resource, and the resource name or other identifier (with the associated file path, when necessary); dates in a specified format (e.g., "2018-10-17"); uniform resource locators (URLs); IP addresses; and, classless inter-domain routing (CIDR) addresses.

The system may be configured to recognize some or all such formats/variable structures, and may conform to the formats/structures when generating anonymized replacement values. Other data formatting constraints may exist in the original document structure. Wildcards and structuring characters (e.g., *, ?, (,), and /) may have special meaning in policy strings and they should be preserved, as they do not in and of themselves constitute customer data; moreover, such structuring characters may indicate other data formatting that must be followed. On the other hand, if customer use of these symbols is especially idiosynchratic as to allow identification of a usage pattern that suggests the presence of private data, the system may be configured to identify the usage pattern and replace the symbols with anonymized data without compromising the document structure. In addition, the security policies themselves have structure, including interrelationships between permissions and between permission fields, references to external data or internal/external program calls, and fields that may be identified as likely to contain, or unlikely to contain, user-specific or other sensitive data. For example, the Action and Effect fields of a permission statement may always contain API calls to services of the computing resource service provider, the API calls being public knowledge; to preserve structure, the system does not anonymize these fields. Generally in the security policy structure described herein, resources, principals, and conditions are the primary areas where customer data is stored; in some embodiments, the system may be configured to always anonymize the data in these fields.

The following example security policy, provided in JSON format, illustrates the field value replacement algorithm:
{
"policyname": "world_writability",
"policies": [
{
"Version": "2012-10-17",
"Id": "Policy1512531905000",
"Statement": [
{
"Action": [
"storage:GetObject",
"storage:GetObjectVersion"
],
"Sid": "Stmt220868258792",
"Resource": "mainPartition:storageService:::acm-relationships-fra/220868258792/*",
"Effect": "Allow",
"Principal": {
"userRole": "mainPartition:policyManager::220868258792:root"
}
},
{
"Action": [
"storage:GetObject",
"storage:GetObjectVersion"
],
"Sid": "Stmt238569614036",
"Resource": "mainPartition:storageService:::acm-relationships-fra/238569614036/*",
"Effect": "Allow",
"Principal": {
""userRole": "mainPartition:policyManager::238569614036:root"}
}
]
}

After a first-stage anonymization using simple string replacement based on a set of parameters defined by the document structure, the anonymized policy/set of permissions may be:
{
"policyName": "AVHERBQWAWVH",
"policies": [
{
"Version": "1970-01-01",
"Id": "BHQPCHBPAWE",
"Statement": [
{
"Action": [
"storage:GetObject",
"storage:GetObjectVersion"
],
"Sid": "PBYHQYBASNWEPAHV",
"Resource": "mainPartition:storageService:::RBYAPBHW/ABHPWAVHAFPN/*",
"Effect": "Allow",
"Principal": {
"userRole": "mainPartition:policyManager::WEAVNPAMFPQW:SBWHPAV"
},
{
"Action": [
"storage:GetObject",
"storage:GetObjectVersion"
],
"Sid": "VXARCHPTRYXPHX",
"Resource": "mainPartition:storageService:::QBNPQWFZXV/BSDFGHPTERWA/*",
"Effect": "Allow",
"Principal": {
"UserRole": "mainPartition:policyManager::BQENVASFPHE:RQBHQASDFPH"
}
}
]
}

The system is also capable of preserving satisfiability while anonymizing (to the extent possible) string constants in the original problem. To do so, the system may have access to both the policy and the properties to be analyzed, as they both will involve string constants and anonymizing one while leaving the other will likely lead to analysis problems that have little bearing on the original problem. In some embodiments, the first-stage anonymization may perform string replacement based on knowledge of the available parameters in the document structure, and further based on one or more string-matching routines that determine a particular string appears multiple times in the security policy, and then determine whether an anonymized replacement string for that string must be used to replace some or all instances of the string. For example, the string may appear in the corresponding values for multiple parameters, indicating an interdependency between the parameters that might be destroyed if different values are substituted for the string in different locations.

A first-stage anonymization of the above example policy, applying string replacement consistency, may be:

{
"policyName": "AVHERBQWAWVH",
"policies": [
{
"Version": "1970-01-01",
"Id": "BHQPCHBPAWE",
"Statement": [
{
"Action": [
"storage:GetObject",
"storage:GetObjectVersion"
],
"Sid": "PBYHQYBASNWEPAHV",
"Resource": "mainPartition:storageService:::RBYAPBHW/ABHPWAVHAFPN/*",
"Effect": "Allow",
"Principal": {
"userRole": "mainPartition:policyManager:: ABHPWAVHAFPN:SBWHPAV"
}
},
{
"Action": [
"storage:GetObject",
"storage:GetObjectVersion"
],
"Sid": "PHXDVNBKERRTY",
"Resource": "mainPartition:storageService::: RBYAPBHW/BSDFGHPTERWA/*",
"Effect": "Allow",
"Principal": {
"UserRole": "mainPartition:policyManager:: BSDFGHPTERWA:SBWHPAV"
}
}
]
}

In this example: the first partition of the resource path, "acm-relationships-fra," is repeated in the Resource fields of both statements, and is replaced by random string "RBYAPBHW" in both instances; the corresponding user IDs identifying the Principal in each statement are also repeated in the statement ID "Sid" and as the second partition of the resource path in each statement—the Principal and Resource instances are replaced with the same string, but the statement identifier is not dependent on the other parameter values and thus it is replaced by a different random string; and, the UserRole of both statements is "root," and both instances of "root" are replaced with the same random string "SBWHPAV" to maintain dependency on the reference to a defined user role in the policy manager service.

In one aspect, the system may preserve equisatisfiability on problems of inclusion—That is, determining whether a string is a member of a regular expression containing string constants, concatenation, wildcards (*, ?), and alternation (|). The regular expression may further include operators like ranges ([0 . . . 9]) and other operators that can be rebuilt.

In addition, the system may consider other structure that impacts equisatisfiability, such as limitations on string length. Assuming that any string literal may be used in a pattern, the system seeks to preserve "matchability:" if it is possible to match two string literals in the original problem, then (and only then) it should be possible to match the transformed literals in the new problem. This re-statement focuses the system on a small part of the overall problem: rather than processing and attempting to transform regular expressions, boolean operators, and the like, the system only transforms string constants.

The system may maintain inclusion relationships between string constants by matching part or all of the strings and selecting anonymized data to maintain the match between matching portions. For matching, there only a few types of relationships between two strings: Substring/Prefix/Suffix/Equal, which are relationships of inclusion (i.e., a string that is a substring, a prefix, a suffix, or an equal of another string is "included" in that string); overlapping, where a portion of a string is the same as a portion of another string; and non-overlapping, where there are no common character patterns between the two strings. In one embodiment, the system may turn all of the overlap relations into inclusion relations, then deal with these uniformly. For example, the system may identify each overlapping portion between any two string constants, and may generate an additional string constant having the string value of the overlapping portion. To illustrate, given an example set of string constants:

S1=Foobaz
S2=Barbaz
S3=Barboz
S4=Barzz
S5=Fbarbozz
S6=Ryl
S7=DBar
S8=arb
S9=bazzz we have an inclusion relationship ([arb] is found in {Barbaz, Barboz,Fbarbozz}), and there are multiple overlap relationships. The first step is to define new string constants for the overlap relationships, and continue determining overlaps and substrings:

S10=Bar (found in S2, S3, S4, S7)
S11=ar (found in S2, S3, S4, S5, S7, S8, S10)
S12=B (found in S2, S3, S4, S7, S10)
S13=b (found in S1, S2, S3, S5, S8, S9).

Note that S11 was constructed because [Bar] and [arb] overlap. S12 and S13 describe "single use" variables that can be replaced by arbitrary strings. The system makes this uniform after performing substitution for S10 . . . S13—all relations can be transformed into explicit inclusion relations using concatenation:

S1=Foobaz
S2=(S12)(S11)(S13)az
S3=(S12)(S11)(S13)oz
S4=Barzz
S5=Fb(S11)(S13)ozz
S6=Ryl
S7=D(S12)(S11)
S8=(S11)(S13)
S9=bazzz
S10=(S12)(S11)
S11=ar
S12=B
S13=b Next, the system may make substitutions for each of the strings such that no new string matches outside of the original matching relations are created. Algorithmically, the problem of generating candidates may be considered as a directed acyclic graph (DAG) in which the nodes are concrete strings to be formed (the assignments to string variables S1 . . . S13) in the example, wherein each concrete string in the RHS (that is, every portion of the defining string that is not a string variable) can be independently replaced with an arbitrary string, so long as the substitutions preserve the inclusion and non-inclusion relations:

S1=Foobaz
S2=(S12)(S11)(S13)(S14)
S3=(S12)(S11)(S13)(S15)
S4=Barzz
S5=Fb(S11)(S13)(S16)
S6=Ryl
S7=(S17)(S12)(S11)
S8=(S11)(S13)
S9=bazzz
S10=(S12)(S11)
S11=ar
S12=B
S13=b
S14=az
S15=oz
S16=ozz
S17=D.

Now the system may replace each concrete string with an arbitrary "fresh" replacement. If the strings are for use in an SMT solver, the system may make the anti-inclusion constraints explicit for all unrelated strings, and then replace all concrete strings with free variables (e.g., S1 !overlap S2 and S1 !overlap S3 . . . and S1 !overlap S13). This would allow the system to turn the whole problem into an SMT problem, which could provide the corresponding concrete substitutions. Note, however, there is a wide space of possible strings, and simpler approaches may suffice. For example, the system could guarantee disinclusion by including a "fresh" character for each substitution that is not in the original character set (new character per substitution), or just try out random strings and backtrack if an undesired match is found.

Figure 5:
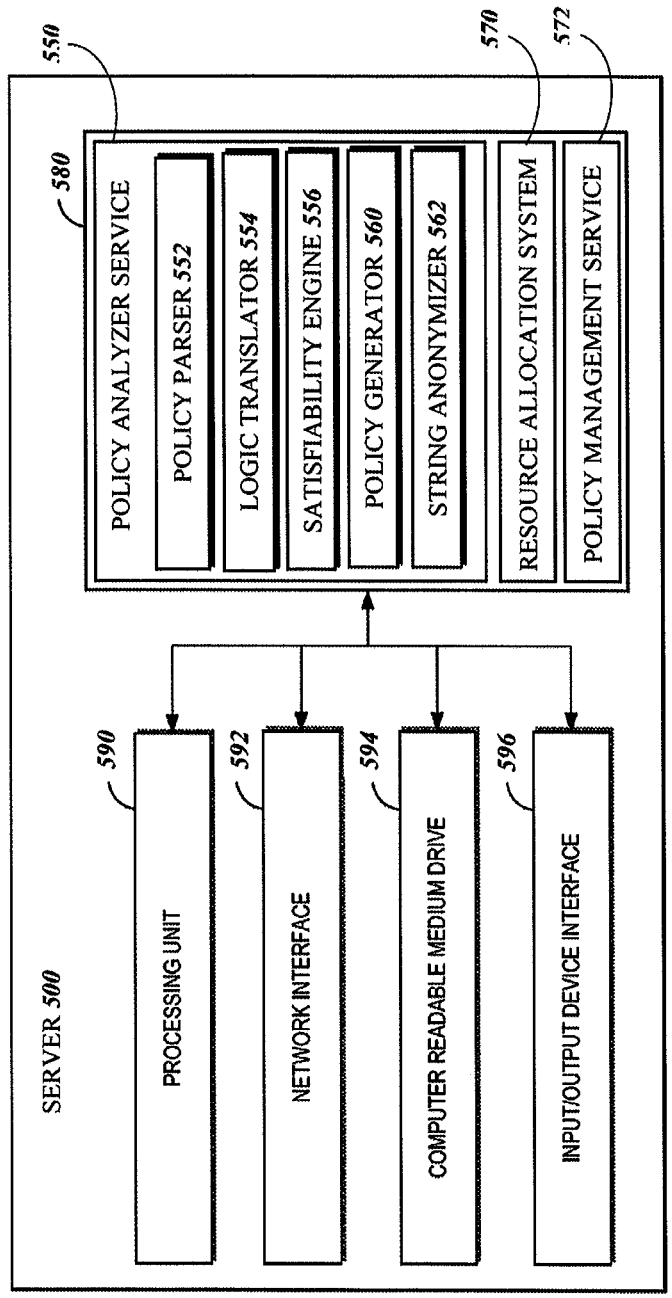
FIG. 5 is a diagram of an example server computing device specially configured to implement the presently described systems and methods.

FIG. 5 depicts a general architecture of a computing system (referenced as server 500) that processes requests to allocate virtual computing resources to a user in a computing environment as described above. The general architecture of the server 500 includes an arrangement of computer hardware and software modules that may be used to implement aspects of the present disclosure. The hardware modules may be implemented with physical electronic devices, as discussed in greater detail below. The server 500 may include many more (or fewer) elements than those shown in FIG. 5. It is not necessary, however, that all of these generally conventional elements be shown in order to provide an enabling disclosure. Additionally, the general architecture illustrated in FIG. 5 may be used to implement one or more of the other components illustrated in the preceding Figures, including the resource allocation system, the security assessment system, and the network-accessible services system, each of which may be implemented in the same or a separate architecture from the others.

As illustrated, the server 500 includes a processing unit (processor) 590, a network interface 592, a computer readable medium drive 594, an input/output device interface 596, all of which may communicate with one another by way of a communication bus. The network interface 592 may provide connectivity to one or more networks or computing systems. The processor 590 may thus receive information and instructions from other computing systems or services via a communication network. The processor 590 may also communicate to and from memory 580 and further provide output information for an optional display (not shown) via the input/output device interface 596. The input/output device interface 596 may also accept input from an optional input device (not shown).

The memory 580 may contain computer program instructions (grouped as modules in some embodiments) that the processor 590 executes in order to implement one or more aspects of the present disclosure. The memory 580 generally includes RAM, ROM and/or other persistent, auxiliary or non-transitory computer-readable media. The memory 580 may include computer program instructions and other information for implementing aspects of the present disclosure. For example, in one embodiment, the memory 580 implements a policy analyzer service 550, a resource allocation system 570, and a policy management service 572, as described above. The memory 580 or another component of the server 500 may further include a computing environment API that may be executed by the processor 590 to enable the services to access and otherwise communicate with the network-accessible services systems described above. In addition, the memory 580 may include and/or provide executable instructions or reference data that enable the processor 590 to communicate with one or more data repositories (not shown), for example, to access usage data, user data, security policies, and the like.

The policy analyzer service 550 may include several services implemented in hardware, software, or a combination thereof, and communicating with various other services and with physical (e.g., hard drives) or virtual resources (e.g. logical drives) to obtain a structured document such as a user-provided security policy and generate an anonymized version of the security policy and/or one or more anonymized versions of a logic problem representing the security policy according to the processes described herein. In some embodiments, a different service 552-562 may analyze, transform, and/or produce different types of data needed to evaluate a security policy, although in other embodiments services may be consolidated, or unused if the corresponding type of data is not collected or analyzed. For example, some or all of the services 552-562 may be "chained" together, in that a first service 552 analyzes data to produce a first result that is delivered to a second service 554, which analyzes the first result as the service's 554 input data (alone or with other data) and produces a second result, and a third service 556 uses the second result (and possibly other data) as its input data to produce a third result. A client may authorize the services 552-560 to access virtual resources associated with the client's user account, so that the services can obtain private and/or remote data.

In various examples, the policy analyzer service 550 may be an anonymizer service as described above, and may include a policy parser 552, a logic translator 554, and a satisfiability engine 556 that cooperate to produce logic problems representing security policies and analyze the logic problems to determine the relative permissiveness of the policies—in other words, the services 552-556 may be used to determine whether two security policies are equivalent, whether a first security policy is more permissive than a second security policy, and more. Additionally or alternatively, the services 552-556 may be used to analyze actual and/or potential regression of a security policy, which is associated with a change in policy parameters that changes the permissiveness of the policy. In this context, permissiveness is used to describe access to resources. For example, if a first policy can be utilized to access to a first computing resource (e.g., resource "A") and a second resource (e.g., resource "B") and a second policy grants access only to computing resource "B," then the first policy may be described as being more permissive than the second policy because there exists a computing resource which the first policy grants access to which the second policy does not grant access to and there does not exist a resource that the second policy grants access to which the first policy does not grant access to. Two policies may be equivalent if they both can be utilized to access to the same resources and deny (either implicitly or explicitly) access to the same resources. Generally speaking, if two policies are not equivalent, they may be said to lack equivalency. In some cases, if a first policy grants access to a first computing resource "A" and a second computing resource "B" and a second policy grants access to the second computing resource "B" and a third computing resource "C" the polices may be said to be incomparable, and thus not equivalent.

In embodiments as described above, the policy parser 552 may accept, as input, one or more security policies and translate them into their constituent permission statements. The permission statements may each be associated with the granting or denying access to (a) computing resource(s). The logic translator 554 may convert the permission statements into corresponding logic problems (e.g., sets of propositional logic expressions or formulae or other first-order logic problems) that include or represent the accessibility constraints represented by the permission statements. The constraints may be described in various formats and in accordance with various standards such as SMT-LIB standard formats, CVC language, and Center for Discrete Mathematics and Theoretical Computer Science (DIMACS) formats. The logic problems may represent a set of constraints that must be satisfied for the corresponding permission statement to be in effect. The satisfiability engine 556 may be a constraint solver or one or more instances of one or more constraint solvers that can read the solver language (i.e., format) of the logic problems. In some embodiments, the satisfiability engine 556 may include multiple different constraint solvers, and/or multiple instances of a constraint solver, each instance having a different configuration for the constraint solver. The satisfiability engine 556 may determine whether the logic problem is satisfiable, which may equate to a determination whether the corresponding security policy is valid. The satisfiability engine 556 may further determine the permissiveness of a security policy by generating one or more data models of the security policy parameters' values that each satisfy the logic problem. The satisfiability engine 556 may compare propositional logic formulae of different policies to each other to determine whether the input security policies are equivalent, whether one policy is more permissive than another policy, whether the policies are incomparable, and so on.

The logic translator 554 and/or satisfiability engine 556 may generate additional logic constraints as part of determining whether a first propositional logic expression is more permissive than a second propositional logic expression. The constraints may be generated based at least in part on client-provided settings. For example, the logic translator 554 may generate constraints that are satisfied only under circumstances where a first policy grants access to a resource and a second policy denies access to the resource or is neutral regarding the resource. In some embodiments, a command may be used to determine whether the set of constraints are satisfiable. A formula may be satisfiable if there is an interpretation that makes all the asserted formulas true. In other words, the model is satisfiable if each of the constraints is satisfied under some conditions. In one example, the satisfiability engine 556 may interpret the formulas at least in part using an SMT solver such as Z3.

The policy analyzer service 550 may include a policy generator 560 that generates anonymized security policies as described above. The policy generator 560 may receive as input different types of data from several sources; non-limiting examples of input data include the user-provided security policy being evaluated and a data set describing field formats and relationships between parameters internal and external to the policy. From the input data, the policy generator 560 may identify fields that contain sensitive data and therefore should be anonymized, fields that do not contain sensitive data and can be left intact, parameter relationships that indicate commonality of values (e.g., a matching string or substring) should be maintained, data formatting such as structuring characters that should be retained, etc.; the policy generator 560 may then anonymize some or all of the sensitive data to produce an anonymized security policy that maintains the structure and satisfiability of the original policy. To wit, the policy generator 560 attempts to encode anonymized constraints (i.e., within permission statements) that are equivalent to those of the user-provided policy; the policy generator 560 may disassemble and transform the input data to produce anonymized permission statements. Each set of permission statements is collectively added to a new anonymized policy, which the policy generator 560 sends to the policy parser 552 as one of the input policies.

The policy analyzer service 550 may include a string anonymizer 562 that receives a logic problem and/or a set of constraints generated (i.e., by the logic translator 554) from the anonymized security policy and further anonymizes the logic problem by replacing some or all of the string constants in the logic problem with anonymized strings, as described above. For example, the string anonymizer 562 may determine the "matchability" of the string constants as described above, and may transform overlapping relations between string constants into inclusion relations; once all overlapping relations are converted, the string anonymizer 562 may replace the included substrings with anonymized data. The anonymized string constants may be stored in a data structure as a generated anonymized logic problem. The string anonymizer 562 may send the generated anonymized logic problem(s) to the satisfiability engine 556 to be evaluated as described above. The string anonymizer 562 may send any anonymized logic problem that is confirmed to satisfy the requirements for accurately representing the structure and content of the original security policy to the developers of the constraint solver(s).

The string anonymizer 562 may further receive two logic problems that were compared by the satisfiability engine 556, and/or the evaluation results describing whether the logic problems are equivalent. In one embodiment, the logic problems received are the original logic problem (i.e., generated from the original policy) and the most recently evaluated anonymized logic problem (i.e., produced from an anonymized policy), after they are determined to be non-equivalent. The string anonymizer 562 may use the evaluation results and/or the logic problems to identify the differences between the two logic problems (e.g., the parts of the string constants in the original logic problem that were anonymized in the anonymized logic problem); based on the document structure and other instance requirements defining which data can and cannot be anonymized, the string anonymizer 562 may then produce additional anonymized logic problems that retain more or less of the original data. The newly generated anonymized logic problems may be fed into the satisfiability engine 556 iteratively until an accurate anonymized logic problem is generated, or a limit on the number of iterations is reached.

Figure 6:
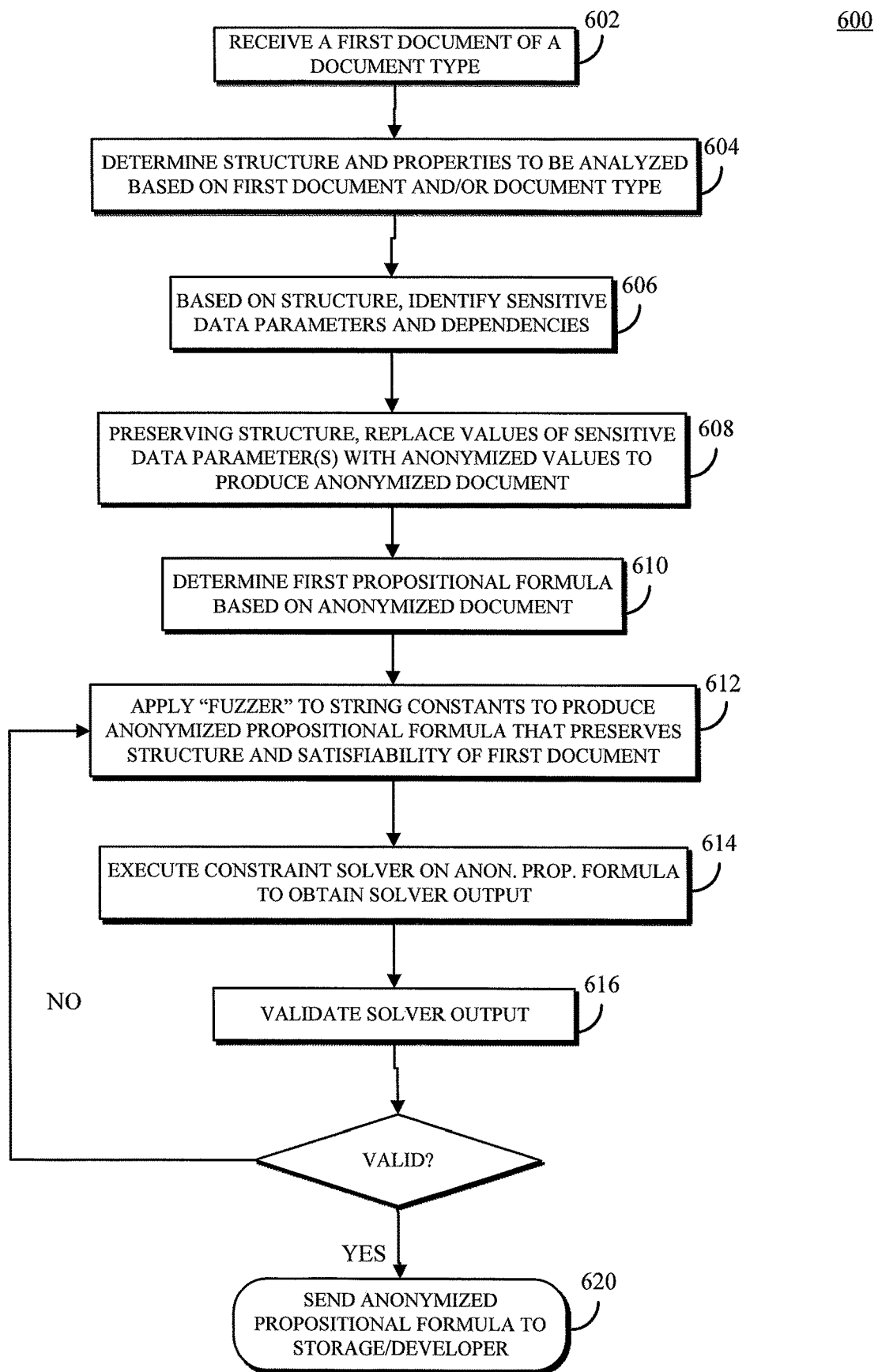
FIG. 6 is a flowchart of an example method of transforming a structured electronic document into a corresponding anonymized propositional logic formula by obscuring sensitive data while maintaining the original structure and satisfiability of the electronic document, in accordance with this disclosure.

FIG. 6 illustrates an example method 600 executable by a system, in accordance with the present disclosure, to transform a structured electronic document into an anonymized logic problem that accurately represents the structured document but obscures any sensitive data in the structured document. At 602, the system may obtain the structured document (having a document type) to be evaluated. For example, a user of the computing resource service provider may provide the structured document to the system via one or more user interfaces, as described above. In some embodiments, the system may receive information associated with the user's account; the information may specify a first structured document of the document type. At 604, the system may determine the structure of the document and, accordingly, identify any properties associated with the document type. At 606, the system may identify the sensitive data to be modified in the structured document, based on the document structure of the document type. For example, the system may obtain parameter values for the document parameters associated with user IDs, personal names, account numbers, resource names, etc.

At 608, the system may generate anonymized data, such as random strings, and replace the extracted values of sensitive data parameters with the anonymized data. To preserve the document structure, the system may determine parameter interdependencies and value formats, and maintain these while performing the string/value replacement. The system thus produces an anonymized document. At 610, the system may determine a first logic problem or part (e.g., constraint, logic formula, logic expression) thereof, based on the anonymized document. For example, the system may execute the logic translator described above to produce a plurality of SMT-LIB statements each representing a constraint on the document parameter values. In some embodiments, at 612 the system may then apply one or more of the above-describing "fuzzing" algorithms to the string constants of the logic problem, to produce an anonymized logic problem. Alternatively, on the first pass of 610 on the structured document, 612 may be skipped unless the first logic problem is determined to be invalid (at 616).

At 614, the system may execute one or more constraint solver instances against the anonymized logic problem to produce a solver output (indicating, e.g., the satisfiability of the logic problem). At 616, the system may validate the solver output, i.e., to indicate that the anonymized logic problem accurately represents the structured document and maintains the document structure while anonymizing the sensitive data. If the solver output is valid, at 620 the system may send the anonymized logic problem to a data storage location and/or to the developers of the constraint solver.

Thus, in accordance with the above description, the present disclosure provides a system, including one or more processors and memory storing computer-executable instructions that, when executed by the one or more processors, cause the system to: receive information associated with a user account of a computing resource service provider, the information specifying a first security policy encoding, according to a document structure, a first set of security permissions for accessing a computing resource provided by the computing resource service provider and associated with the user account; determine, based on the document structure, a first parameter of a plurality of parameters identified by the first set of security permissions, and a first format applied to values of the first parameter, the first parameter being associated with private data associated with one or both of the user account and the computing resource; obtain from the first set of security permissions a first value of the first parameter; generate an anonymized value according to the first format; generate, according to the document structure, a second set of security permissions identifying the plurality of parameters and including one or more transformations of the private data into anonymized data, the one or more transformations including a replacement of the first value in association with the first parameter with the anonymized value; determine a first propositional logic expression in a solver language recognized by a first constraint solver based at least in part on the second set of security permissions and including a plurality of string constants representing the corresponding values, stored in the second set of security permissions, of the plurality of parameters, and a plurality of constraints on the plurality of string constants; anonymize one or more of the plurality of string constants to produce an anonymized propositional logic expression representing the first security policy according to the document structure and in the solver language, wherein the private data contained in the first security policy cannot be determined from the anonymized propositional logic expression; and, perform an action associated with including the anonymized propositional logic expression in a set of test instances delivered to a developer of the first constraint solver, the test instances representing anonymized logic problems associated with the document structure.

Executing the instructions may further cause the system to: determine, based on the document structure, a second parameter, of the plurality of parameters, that is associated with public data describing an operation of a service of the computing resource service provider; obtain from the first set of security permissions a second value of the second parameter; and, to generate the second set of security permissions, include the second value in association with the second parameter in the second set of security permissions. To anonymize one or more of the plurality of string constants, the instructions, when executed, may cause the system to: identify a plurality of matches between various pairs of the plurality of string constants, each match indicating that at least part of one string constant of the corresponding pair appears in the other string constant of the corresponding pair; classify a first match of the plurality of matches as a first inclusion relation, of a plurality of inclusion relations, wherein a first string constant of the first match appears entirely in a second string constant of the first match; classify a second match of the plurality of matches as an overlap relation, wherein a third string constant of the second match includes a first substring, at a beginning or an end of the third string constant, that appears at a beginning or an end of a fourth string constant of the second match; add the first substring to the plurality of string constants; add, to the plurality of matches, a third match between the first substring and the third string constant, and a fourth match between the first substring and the fourth string constant; classify the third and fourth matches as second and third inclusion relations, respectively, of the plurality of inclusion relations; and, for each of the plurality of matches classified as one of the plurality of inclusion relations, identify in the corresponding pair of string constants an included string and a compound string that includes the included string and an additional substring, generate a first arbitrary string and a second arbitrary string, replace all appearances of the included string with the first arbitrary string, and replace all appearances of the additional substring with the second arbitrary string.

The instructions, when executed, may cause the system to: determine a second propositional logic expression in the solver language based at least in part on the first set of security permissions, the second propositional logic expression representing the first security policy with non-anonymized data including the private data; and, to perform the action, cause a first instance of the first constraint solver to execute against the first propositional logic expression and, after a first execution duration, produce a first output representing a satisfiability of the first propositional logic expression, cause the first instance or a second instance of the first constrain solver to execute against the second propositional logic expression and, after a second execution duration, produce a second output representing a satisfiability of the second propositional logic expression, and determine that the first and second propositional logic expressions have the same satisfiability and approximately equal difficulty represented by the first and second execution durations.

In another aspect, the disclosure provides a system, including one or more processors and memory storing computer-executable instructions that, when executed by the one or more processors, cause the system to: receive information associated with a user account of a computing resource service provider, the information specifying an electronic document of a first document type; determine a first set of constraints on a plurality of parameters defined by the first document type, the electronic document encoding the plurality of parameters and a plurality of values each associated with a corresponding parameter of the plurality of parameters; determine that the plurality of values include sensitive data; anonymize the sensitive data in one or both of the electronic document and the first set of constraints to produce a second set of constraints on the plurality of parameters, the second set of constraints including anonymized data that obscures the sensitive data of the plurality of values; determine whether the second set of constraints accurately represents the electronic document; and, responsive to a determination that the second set of constraints accurately represents the electronic document, perform an action associated with including the second set of constraints in a first test instance of a set of test instances delivered to a developer of a first constraint solver, the test instances representing anonymized logic problems associated with the first document type. To anonymize the sensitive data, executing the instructions may further cause the system to: identify structured data in the electronic document, the structured data including the sensitive data; determine a document structure associated with the first document type and defining the structured data and one or more data dependencies associated with various ones of the plurality of values; determine an anonymization of the sensitive data that conforms to the document structure; and, using the anonymization, transform the structured data to produce the anonymized data.

To determine the anonymization, executing the instructions may further cause the system to: determine, based on the document structure, that a first parameter of the plurality of parameters is associated with non-sensitive data; and, configure the anonymization to not transform the corresponding value associated with the first parameter in the electronic document. To transform the structured data to produce the anonymized data, executing the instructions may further cause the system to receive a set of structuring characters that control formatting of the plurality of values within the electronic document and, for each value of the plurality of values appearing in the structured data: determine whether the anonymization indicates that the value is to be transformed to anonymized data; responsive to a determination that the value is to be transformed, determine whether the value is a string of characters; and, responsive to a determination that the value is a string of characters, identify a first structuring character of the set of structuring characters, determine one or more substrings of the string, the substrings defined by the first structuring character, and anonymize the one or more substrings to produce an anonymized value including one or more anonymized substrings and the first structuring character. To anonymize the sensitive data, the instructions, when executed, may cause the system to: identify a plurality of relationships between a plurality of string constants defined in the first set of constraints; replace some or all of one or more of the plurality of string constants with one or more arbitrary substrings to produce one or more transformed string constants; and determine, subsequent to replacement, that the plurality of relationships remain intact. The plurality of relationships may include matches between substrings of at least two of the plurality of string constants. To determine that the plurality of relationships remain intact, executing the instructions further causes the system to determine that: for each match between substrings, the one or more arbitrary substrings that replace the substrings also match; and each of the one or more transformed string constants only matches another of the one or more transformed string constants if the corresponding string constants of the plurality of string constants also matched.

To determine whether the second set of constraints accurately represents the electronic document, executing the instructions further causes the system to: cause one or more instances of the first constraint solver to execute against a first logic problem including the first set of constraints formatted in a solver language readable by the first constraint solver and a second logic problem including the second set of constraints in the solver language, the one or more instances producing a first result of evaluating the first logic problem and a second result of evaluating the second logic problem; and, determine whether the first result and the second result are equivalent, wherein the second set of constraints accurately represents the electronic document if the first result and the second result are equivalent. The first constraint solver may be a satisfiability modulo theories (SMT) solver, the one or more instances may evaluate the first logic problem in a first duration and evaluate the second logic problem in a second duration, and the first result and the second result may be considered equivalent when: the first result and the second result indicate that the first logic problem and the second logic problem have the same satisfiability; and, the second duration is within a predetermined threshold length of time of the first duration. Executing the instructions may further cause the system to, responsive to a determination that the second set of constraints does not accurately represent the electronic document: perform a second anonymization of the sensitive data in one or both of the electronic document and the first set of constraints to produce a third set of constraints on the plurality of parameters, the third set of constraints including re-anonymized data that obscures the sensitive data of the plurality of values and that is different from the anonymized data of the second set of constraints; determine whether the third set of constraints accurately represents the electronic document; and, perform an action associated with including the third set of constraints in the first test instance.

In yet another aspect, the present disclosure provides a system, including one or more processors and memory storing computer-executable instructions that, when executed by the one or more processors, cause the system to: receive a plurality of electronic documents of a first document type; for each document of the plurality of electronic documents: perform a first anonymization of sensitive data in the document; determine a first set of constraints on a plurality of parameters defined by the first document type, the electronic document encoding the plurality of parameters and a plurality of values each associated with a corresponding parameter of the plurality of parameters; perform a second anonymization of the first set of constraints to produce a second set of constraints on the plurality of parameters; determine, based on the second set of constraints, an anonymized logic problem in a solver language recognized by a first constraint solver; determine whether the anonymized logic problem accurately represents the document; and, responsive to a determination that the anonymized logic problem accurately represents the document, add the anonymized logic problem to a set of test instances representing anonymized logic problems associated with the first document type; and perform an action associated with delivering the set of test instances to a developer of the first constraint solver. The plurality of electronic documents may be security policies each controlling access to one or more computing resources provided by a computing resource service provider and associated with a corresponding user account.

To perform the first or second anonymization, executing the instructions may further cause the system to: identify structured data in the electronic document, the structured data including the sensitive data; determine a document structure associated with the first document type and defining the structured data and one or more data dependencies associated with various ones of the plurality of values; determine an anonymization of the sensitive data that conforms to the document structure; and, using the anonymization, transform the structured data to produce the anonymized data. To determine the anonymization, executing the instructions further may cause the system to: determine, based on the document structure, that a first parameter of the plurality of parameters is associated with non-sensitive data; and, configure the anonymization to not transform the corresponding value associated with the first parameter in the electronic document.

The first set of constraints may include a plurality of string constants, and to perform the second anonymization, executing the instructions further causes the system to: identify a plurality of matches between various pairs of the plurality of string constants, each match indicating that at least part of one string constant of the corresponding pair appears in the other string constant of the corresponding pair; and, replace the at least one part of each string constant in the pair that matches with a corresponding arbitrary string. To replace the at least one part, executing the instructions further causes the system to: classify a first match of the plurality of matches as an overlap relation, wherein a first string constant of the first match includes a first substring, at a beginning or an end of the first string constant, that appears at a beginning or an end of a second string constant of the first match; add the first substring to the plurality of string constants; add, to the plurality of matches, a second match between the first substring and the first string constant, the second match being classified as one of a plurality of inclusion relations, and a third match between the first substring and the second string constant, the third match being classified as one of the plurality of inclusion relations; and, for each of the plurality of matches classified as one of the plurality of inclusion relations, identify in the corresponding pair of string constants an included string and a compound string that includes the included string and an additional substring, generate a first arbitrary string and a second arbitrary string, replace all appearances of the included string with the first arbitrary string, and replace all appearances of the additional substring with the second arbitrary string. Executing the instructions may further cause the system to anonymize all of the plurality of string constants.

The various embodiments described herein can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising one or more processors and memory storing computer-executable instructions that, when executed by the one or more processors, cause the system to:
  receive information associated with a user account of a computing resource service provider, the information specifying a first security policy encoding, according to a document structure, a first set of security permissions for accessing a computing resource provided by the computing resource service provider and associated with the user account;
  determine, based on the document structure, a first parameter of a plurality of parameters identified by the first set of security permissions, and a first format applied to values of the first parameter, the first parameter being associated with private data associated with one or both of the user account and the computing resource;
  obtain from the first set of security permissions a first value of the first parameter;
  generate an anonymized value according to the first format;
  generate, according to the document structure, a second set of security permissions identifying the plurality of parameters and comprising one or more transformations of the private data into anonymized data, the one or more transformations including a replacement of the first value in association with the first parameter with the anonymized value;
  determine a first propositional logic expression in a solver language recognized by a first constraint solver based at least in part on the second set of security permissions and comprising:
    a plurality of string constants representing the corresponding values, stored in the second set of security permissions, of the plurality of parameters; and
    a plurality of constraints on the plurality of string constants;
  anonymize one or more of the plurality of string constants to produce an anonymized propositional logic expression representing the first security policy according to the document structure and in the solver language, wherein the private data contained in the first security policy cannot be determined from the anonymized propositional logic expression; and
  perform an action associated with including the anonymized propositional logic expression in a set of test instances delivered to a developer of the first constraint solver, the test instances representing anonymized logic problems associated with the document structure.

2. The system of claim 1, wherein executing the instructions further causes the system to:
  determine, based on the document structure, a second parameter, of the plurality of parameters, that is associated with public data describing an operation of a service of the computing resource service provider;

obtain from the first set of security permissions a second value of the second parameter; and to generate the second set of security permissions, include the second value in association with the second parameter in the second set of security permissions.

3. The system of claim 1, wherein to anonymize one or more of the plurality of string constants, the instructions, when executed, cause the system to:

identify a plurality of matches between various pairs of the plurality of string constants, each match indicating that at least part of one string constant of the corresponding pair appears in the other string constant of the corresponding pair;

classify a first match of the plurality of matches as a first inclusion relation, of a plurality of inclusion relations, wherein a first string constant of the first match appears entirely in a second string constant of the first match;

classify a second match of the plurality of matches as an overlap relation, wherein a third string constant of the second match includes a first substring, at a beginning or an end of the third string constant, that appears at a beginning or an end of a fourth string constant of the second match;

add the first substring to the plurality of string constants;

add to the plurality of matches:
  a third match between the first substring and the third string constant; and
  a fourth match between the first substring and the fourth string constant;

classify the third and fourth matches as second and third inclusion relations, respectively, of the plurality of inclusion relations; and for each of the plurality of matches classified as one of the plurality of inclusion relations:
  identify in the corresponding pair of string constants an included string and a compound string that includes the included string and an additional substring;
  generate a first arbitrary string and a second arbitrary string;
  replace all appearances of the included string with the first arbitrary string; and
  replace all appearances of the additional substring with the second arbitrary string.

4. The system of claim 1, wherein the instructions, when executed, cause the system to:

determine a second propositional logic expression in the solver language based at least in part on the first set of security permissions, the second propositional logic expression representing the first security policy with non-anonymized data including the private data; and to perform the action:
  cause a first instance of the first constraint solver to execute against the first propositional logic expression and, after a first execution duration, produce a first output representing a satisfiability of the first propositional logic expression;
  cause the first instance or a second instance of the first constrain solver to execute against the second propositional logic expression and, after a second execution duration, produce a second output representing a satisfiability of the second propositional logic expression; and
  determine that the first and second propositional logic expressions have the same satisfiability and approximately equal difficulty represented by the first and second execution durations.

5. A system, comprising one or more processors and memory storing computer-executable instructions that, when executed by the one or more processors, cause the system to:

receive information associated with a user account of a computing resource service provider, the information specifying an electronic document of a first document type;

determine a first set of constraints on a plurality of parameters defined by the first document type, the electronic document encoding the plurality of parameters and a plurality of values each associated with a corresponding parameter of the plurality of parameters;

determine that the plurality of values include sensitive data;

anonymize the sensitive data in one or both of the electronic document and the first set of constraints to produce a second set of constraints on the plurality of parameters, the second set of constraints comprising anonymized data that obscures the sensitive data of the plurality of values;

determine whether the second set of constraints accurately represents the electronic document; and responsive to a determination that the second set of constraints accurately represents the electronic document, perform an action associated with including the second set of constraints in a first test instance of a set of test instances delivered to a developer of a first constraint solver, the test instances representing anonymized logic problems associated with the first document type.

6. The system of claim 5, wherein to anonymize the sensitive data, executing the instructions further causes the system to:

identify structured data in the electronic document, the structured data comprising the sensitive data;

determine a document structure associated with the first document type and defining the structured data and one or more data dependencies associated with various ones of the plurality of values;

determine an anonymization of the sensitive data that conforms to the document structure; and using the anonymization, transform the structured data to produce the anonymized data.

7. The system of claim 6, wherein to determine the anonymization, executing the instructions further causes the system to:

determine, based on the document structure, that a first parameter of the plurality of parameters is associated with non-sensitive data; and configure the anonymization to not transform the corresponding value associated with the first parameter in the electronic document.

8. The system of claim 6, wherein to transform the structured data to produce the anonymized data, executing the instructions further causes the system to:

receive a set of structuring characters that control formatting of the plurality of values within the electronic document; and for each value of the plurality of values appearing in the structured data:
  determine whether the anonymization indicates that the value is to be transformed to anonymized data;

responsive to a determination that the value is to be transformed, determine whether the value is a string of characters; and
responsive to a determination that the value is a string of characters:
identify a first structuring character of the set of structuring characters;
determine one or more substrings of the string, the substrings defined by the first structuring character; and
anonymize the one or more substrings to produce an anonymized value comprising one or more anonymized substrings and the first structuring character.

9. The system of claim 5, wherein to anonymize the sensitive data, the instructions, when executed, cause the system to:
identify a plurality of relationships between a plurality of string constants defined in the first set of constraints; and
replace some or all of one or more of the plurality of string constants with one or more arbitrary substrings to produce one or more transformed string constants; and
determine subsequent to replacement that the plurality of relationships remain intact.

10. The system of claim 9, wherein the plurality of relationships comprise matches between substrings of at least two of the plurality of string constants, and to determine that the plurality of relationships remain intact, executing the instructions further causes the system to determine that:
for each match between substrings, the one or more arbitrary substrings that replace the substrings also match; and
each of the one or more transformed string constants only matches another of the one or more transformed string constants if the corresponding string constants of the plurality of string constants also matched.

11. The system of claim 5, wherein to determine whether the second set of constraints accurately represents the electronic document, executing the instructions further causes the system to:
cause one or more instances of the first constraint solver to execute against a first logic problem comprising the first set of constraints formatted in a solver language readable by the first constraint solver and a second logic problem comprising the second set of constraints in the solver language, the one or more instances producing a first result of evaluating the first logic problem and a second result of evaluating the second logic problem; and
determine whether the first result and the second result are equivalent, wherein the second set of constraints accurately represents the electronic document if the first result and the second result are equivalent.

12. The system of claim 11, wherein:
the first constraint solver is a satisfiability modulo theories (SMT) solver;
the one or more instances evaluate the first logic problem in a first duration and evaluate the second logic problem in a second duration; and
the first result and the second result are equivalent when:
the first result and the second result indicate that the first logic problem and the second logic problem have the same satisfiability; and
the second duration is within a predetermined threshold length of time of the first duration.

13. The system of claim 5, wherein executing the instructions further causes the system to, responsive to a determination that the second set of constraints does not accurately represent the electronic document:
perform a second anonymization of the sensitive data in one or both of the electronic document and the first set of constraints to produce a third set of constraints on the plurality of parameters, the third set of constraints comprising re-anonymized data that obscures the sensitive data of the plurality of values and that is different from the anonymized data of the second set of constraints;
determine whether the third set of constraints accurately represents the electronic document; and
perform an action associated with including the third set of constraints in the first test instance.

14. A system, comprising one or more processors and memory storing computer-executable instructions that, when executed by the one or more processors, cause the system to:
receive a plurality of electronic documents of a first document type;
for each document of the plurality of electronic documents:
perform a first anonymization of sensitive data in the document;
determine a first set of constraints on a plurality of parameters defined by the first document type, the electronic document encoding the plurality of parameters and a plurality of values each associated with a corresponding parameter of the plurality of parameters;
perform a second anonymization of the first set of constraints to produce a second set of constraints on the plurality of parameters;
determine, based on the second set of constraints, an anonymized logic problem in a solver language recognized by a first constraint solver;
determine whether the anonymized logic problem accurately represents the document; and
responsive to a determination that the anonymized logic problem accurately represents the document, add the anonymized logic problem to a set of test instances representing anonymized logic problems associated with the first document type; and
perform an action associated with delivering the set of test instances to a developer of the first constraint solver.

15. The system of claim 14, wherein the plurality of electronic documents are security policies each controlling access to one or more computing resources provided by a computing resource service provider and associated with a corresponding user account.

16. The system of claim 14, wherein to perform the first or second anonymization, executing the instructions further causes the system to:
identify structured data in the electronic document, the structured data comprising the sensitive data;
determine a document structure associated with the first document type and defining the structured data and one or more data dependencies associated with various ones of the plurality of values;
determine an anonymization of the sensitive data that conforms to the document structure; and
using the anonymization, transform the structured data to produce the anonymized data.

17. The system of claim 16, wherein to determine the anonymization, executing the instructions further causes the system to:
- determine, based on the document structure, that a first parameter of the plurality of parameters is associated with non-sensitive data; and
- configure the anonymization to not transform the corresponding value associated with the first parameter in the electronic document.

18. The system of claim 14, wherein the first set of constraints comprises a plurality of string constants, and to perform the second anonymization, executing the instructions further causes the system to:
- identify a plurality of matches between various pairs of the plurality of string constants, each match indicating that at least part of one string constant of the corresponding pair appears in the other string constant of the corresponding pair; and
- replace the at least one part of each string constant in the pair that matches with a corresponding arbitrary string.

19. The system of claim 18, wherein to replace the at least one part, executing the instructions further causes the system to:
- classify a first match of the plurality of matches as an overlap relation, wherein a first string constant of the first match includes a first substring, at a beginning or an end of the first string constant, that appears at a beginning or an end of a second string constant of the first match;
- add the first substring to the plurality of string constants;
- add to the plurality of matches:
  - a second match between the first substring and the first string constant, the second match being classified as one of a plurality of inclusion relations; and
  - a third match between the first substring and the second string constant, the third match being classified as one of the plurality of inclusion relations; and
- for each of the plurality of matches classified as one of the plurality of inclusion relations:
  - identify in the corresponding pair of string constants an included string and a compound string that includes the included string and an additional substring;
  - generate a first arbitrary string and a second arbitrary string;
  - replace all appearances of the included string with the first arbitrary string; and
  - replace all appearances of the additional substring with the second arbitrary string.

20. The system of claim 19, wherein executing the instructions further causes the system to anonymize all of the plurality of string constants.

* * * * *